June 9, 1953

R. B. HERBERT ET AL 2,641,319

RADIO INDEX PUNCH

Filed Sept. 14, 1951

INVENTORS
ROBERT B. HERBERT
BY WILLIS E. FOX

ATTORNEY

INVENTORS
ROBERT B. HERBERT
BY WILLIS E. FOX
Charles E. McTiernan
ATTORNEY

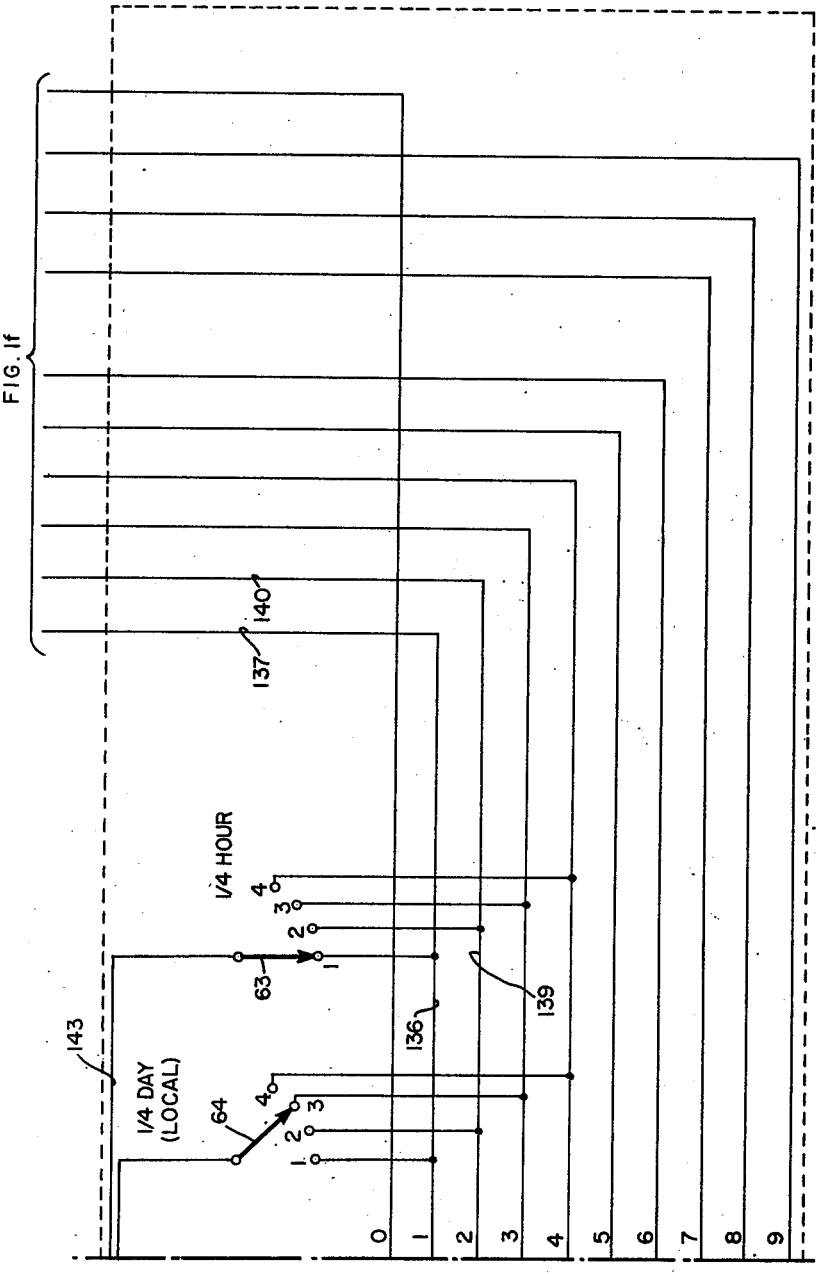

INVENTORS
ROBERT B. HERBERT
BY WILLIS E. FOX
ATTORNEY

INVENTORS
ROBERT B. HERBERT
BY WILLIS E. FOX

ATTORNEY

June 9, 1953    R. B. HERBERT ET AL    2,641,319
RADIO INDEX PUNCH

Filed Sept. 14, 1951    21 Sheets-Sheet 18

BEGINNING OF TAPE — TAPE INSERTED IN HOME RECEIVER
AT 1:45 P.M. ON DEC. 8, 1950
HOME NUMBER 123

RECEIVER SILENT AT 5:00 P.M.
RECEIVER TUNED FROM SILENCE TO STATION #13 AT 5:04 P.M.

RECEIVER REMAINS ON STATION #13 AT 5:15 P.M.

RECEIVER TRANSFERRED FROM STATION #13 TO #8 AT 5:30 P.M.

RECEIVER TURNED OFF AT 5:45 P.M.

LINE TRACED BY STYLUS
IN HOME RECEIVER

RECEIVER TUNED FROM SILENCE TO STATION #3 AT 6:30 P.M.

RECEIVER TURNED OFF AT 6:40 P.M.

RECEIVER TURNED ON AT 7:00 P.M.
RECEIVER TURNED OFF AT 7:05 P.M.

HUNTING FOR PROGRAM

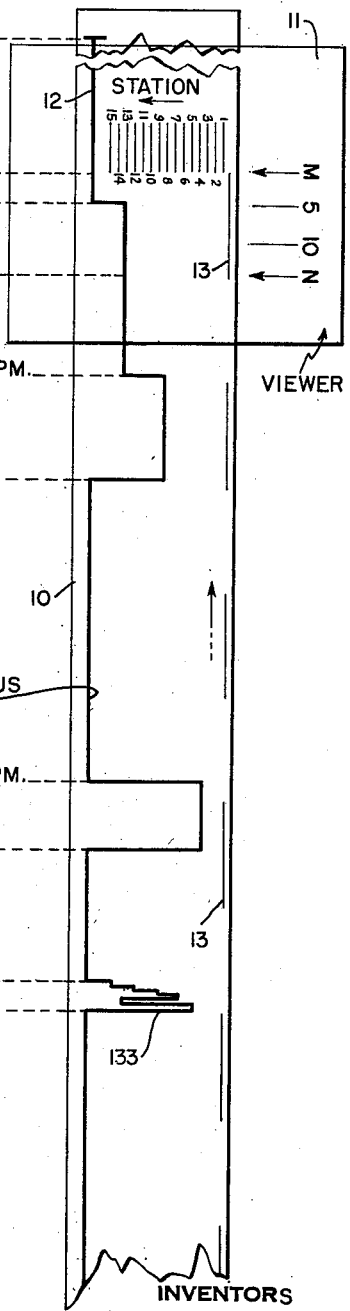

FIG. 5

INVENTORS
ROBERT B. HERBERT
BY WILLIS E. FOX
ATTORNEY

June 9, 1953  R. B. HERBERT ET AL  2,641,319
RADIO INDEX PUNCH
Filed Sept. 14, 1951  21 Sheets-Sheet 19
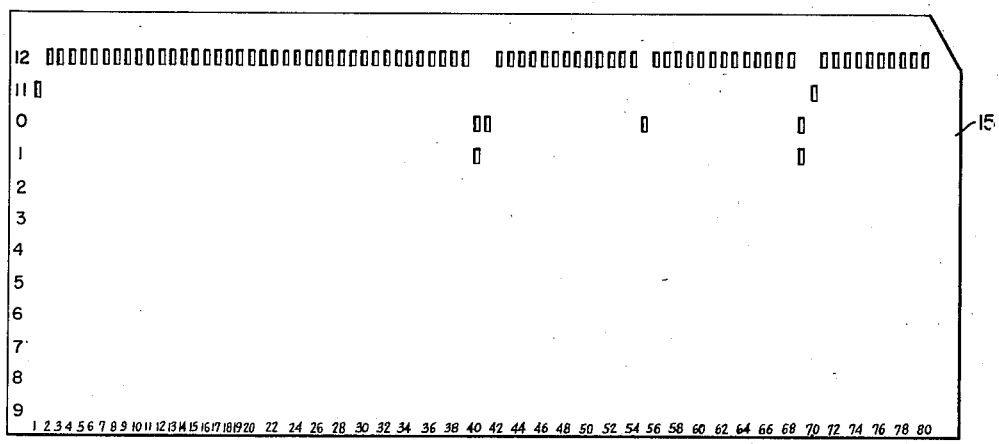
FIG. 6
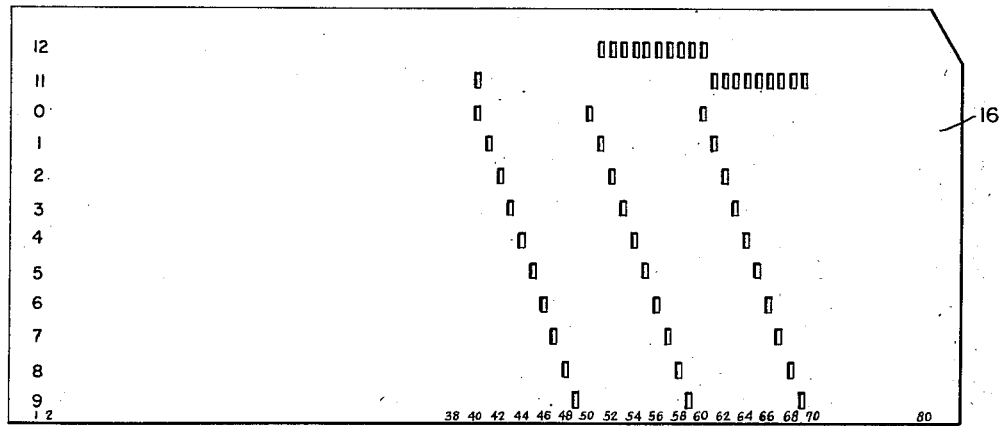
FIG. 9
FIG. 10
INVENTORS
ROBERT B. HERBERT
WILLIS E. FOX
BY
Charles E. McTiernan
ATTORNEY June 9, 1953   R. B. HERBERT ET AL   2,641,319
RADIO INDEX PUNCH Filed Sept. 14, 1951   21 Sheets-Sheet 20

INVENTORS
ROBERT B. HERBERT
BY WILLIS E. FOX

Charles E. McTiernan
ATTORNEY

Patented June 9, 1953

2,641,319

UNITED STATES PATENT OFFICE 2,641,319

RADIO INDEX PUNCH

Robert B. Herbert and Willis E. Fox, Poughkeepsie, N. Y., assignors to International Business Machines Corporation, New York, N. Y., a corporation of New York Application September 14, 1951, Serial No. 246,678

6 Claims. (Cl. 164—113)

1

The present invention relates to record card punching machines and more particularly to punching machines for automatically punching record cards of the well known IBM type under the control of a pair of program cards.

The apparatus forming the basis of the invention described and claimed herein is adapted to cause the punching in a final record card of data obtained during a radio and television survey in which the listening habits of an individual receiver owner are recorded. This survey is made possible by connecting a clock-driven mechanism audimeter, to the radio or television set located in the home. Homes are selected on a scientific basis in order to permit surveys of the listening habits of the individual set owner on the basis of income group, family size, occupation and the like, which will be sufficiently accurate to permit projection to a regional or national scope.

The original record produced by the audimeters may be either of two types, waxed paper tape or photographic film. In the tape system the waxed paper which is driven by a clock-driven mechanism is moved beneath the stylus, the position of which is controlled by the station to which the set is tuned. The result is a record on which is inscribed a line varying from one position to another across the surface of the tape, thus indicating the stations tuned to and the extent of the time during which the station was tuned during the life of the tape, which may be for the duration of one month much in a manner similar to the apparatus described in Patent No. 1,525,329, issued February 3, 1925 to J. A. Singer.

The time at which the stations are tuned on or off is determined by measurement along the tape from the starting point, the time of which is carefully noted by the service man when installing the tape in the receiving set of the home owner. In order to orient the intermediate portions of the tape record with the starting point thereof, the tape is marked every other quarter-hour with a line, such as 13 (Fig. 5). When photographic film is employed in place of the waxed paper tape, the time of tuning is noted by the photoelectric marking means method which results in the same pattern being produced that the stylus marks on a paper tape in a manner shown generally in Patent No. 2,496,392, issued February 7, 1950 to A. F. Hasbrook. In either case, when the tape or film is installed by the service man it is marked with the Home Number and other data to identify it.

The card punching operation representing the basis of the present invention consists of transcribing the information from tape or film to

2 punched card form. It is desired to punch one card for each station change, one for the termination of each quarter-hour interval, and one for each listening period of a plurality of periods within a quarter-hour interval. The individual card punching requires the operator to visually determine, by reference to the tape or film, the station tuned to, the time the station was tuned in and the time the station was tuned off and enter this data by the use of a keyboard to punch holes in the card. Punching will then occur when all three factors have been entered and not before. The automatic stepping which will be under control of a pair of program cards will result in there being punched in a record card for each station or for each quarter-hour interval the month, the week, the day, the hour and the quarter-day, the station tuned in, the time tuned on, the time tuned off, and elapsed time for which the station had been tuned, the condition of the set, whether it was on or off, or tuned to the same station, and the Home Number. The day, hour and quater-day data will be punched in standard time and in daylight time if the station tuned in is operating on the latter time.

The principal object of the instant invention is to provide means for punching in a final record card significant data concerning the radio or television listening habits of a home.

Another object of the invention is to provide program card controlled punching means which is not rendered effective until indications representative of the particular station tuned in, and the time the station was tuned in and off have been entered in allied circuits.

A further object of the invention is to provide means for transferring a time-off setting of one card to a time-on setting of the next following card during periods of continuous listening.

A still further object of the invention is to provide means for punching the elapsed listening time during a 15-minute interval into a record card.

Other objects of the invention will be pointed out in the following description and claims and illustrated in the accompanying drawings, which disclose, by way of examples, the principle of the invention and the best mode, which has been contemplated, of applying that principle.

In the drawings:

Figures 1a, 1b, 1c, 1d and 1e, 1f, 1g, 1h, 1i, 1j, 1k, 1m and 1n arranged horizontally in the order named constitute a wiring diagram of the electric circuits of the machine.

Figures 2a and 2b are views of settable switches representative of various phases of time which are to be successively read out.

Figure 5 is a showing of the tape from which data to be punched in a detail card is visually determined.

Figure 6 is a face view of a portion of a detail final record card showing certain printed data which are to be recorded therein pursuant to the disclosing of the operation of the apparatus according to a typical selected problem.

Figure 7 is a fragmentary showing of a portion of a circuit arrangement as described in the patent application Serial No. 103,224, filed July 6, 1949, by E. W. Gardinor et al., and as modified by the present invention. This figure is located on the sheet containing Figure 1e.

Figures 8a and 8b are each a fragmentary showing of a portion of the circuit arrangement of the aforementioned application as modified by the present invention. These figures are located on the sheet containing Figure 1n.

Figure 9 is a face view of one of two program cards used.

Figure 10 is a face view of the other of two program cards used.

Figure 11:
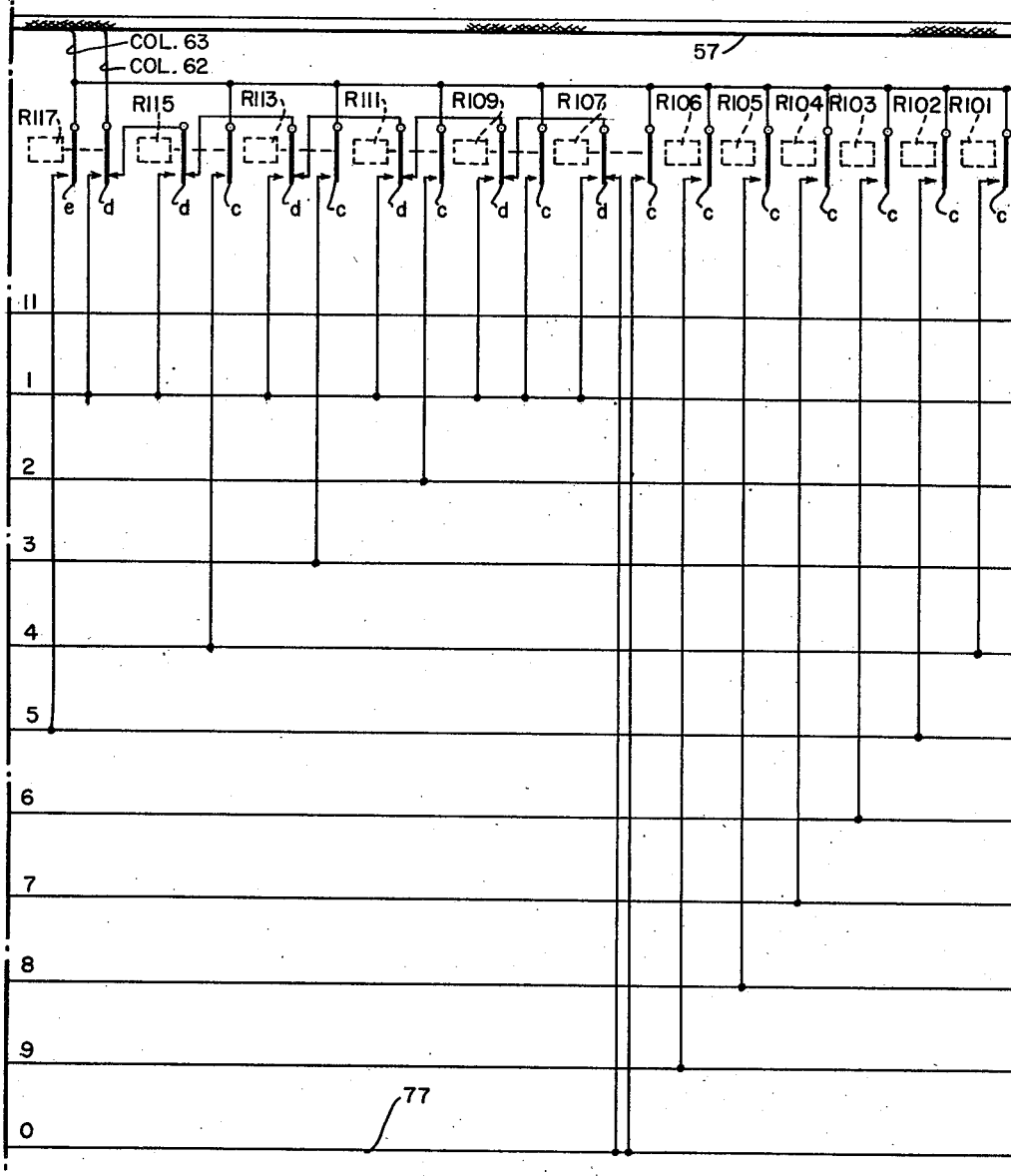

Figure 11 is a view showing the two program drums and the associated sensing elements. This figure is similar to Fig. 23 of the aforementioned Gardinor application.

Figure 12:
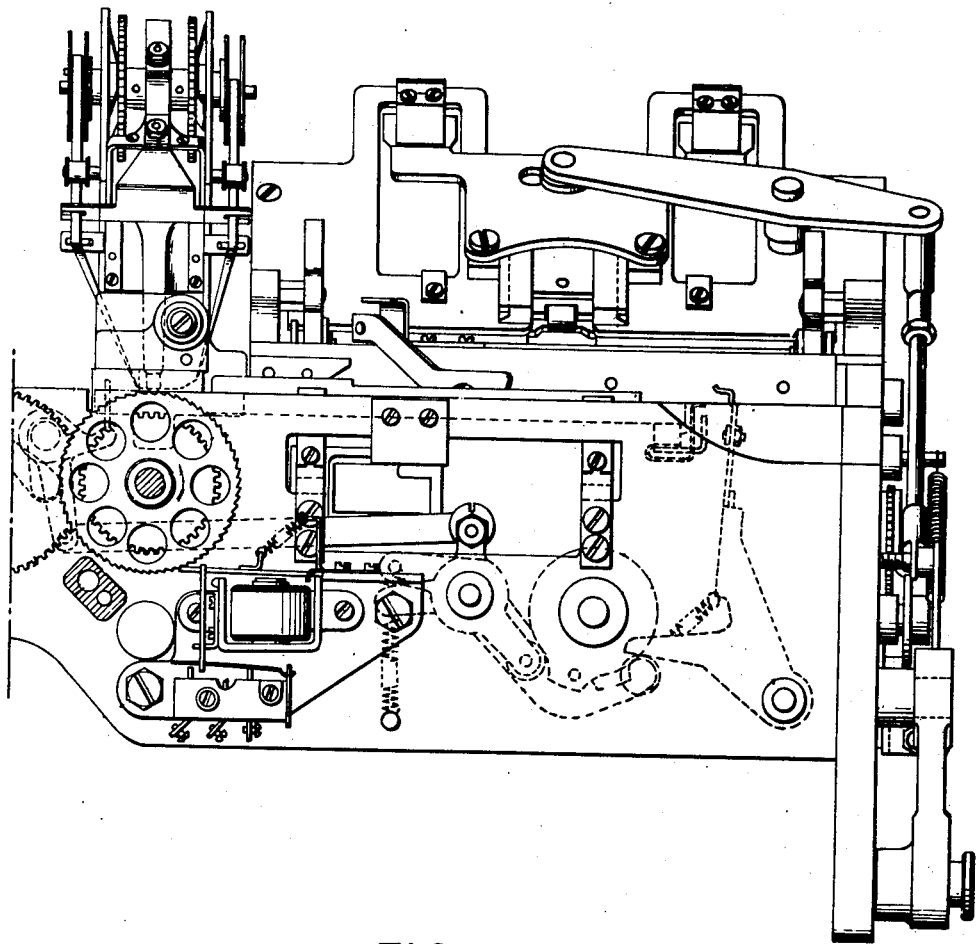

Fig. 12 is a front elevation view showing the escapement mechanism. This figure is similar to Fig. 2 of the aforementioned Gardinor application.

Figure 1A:
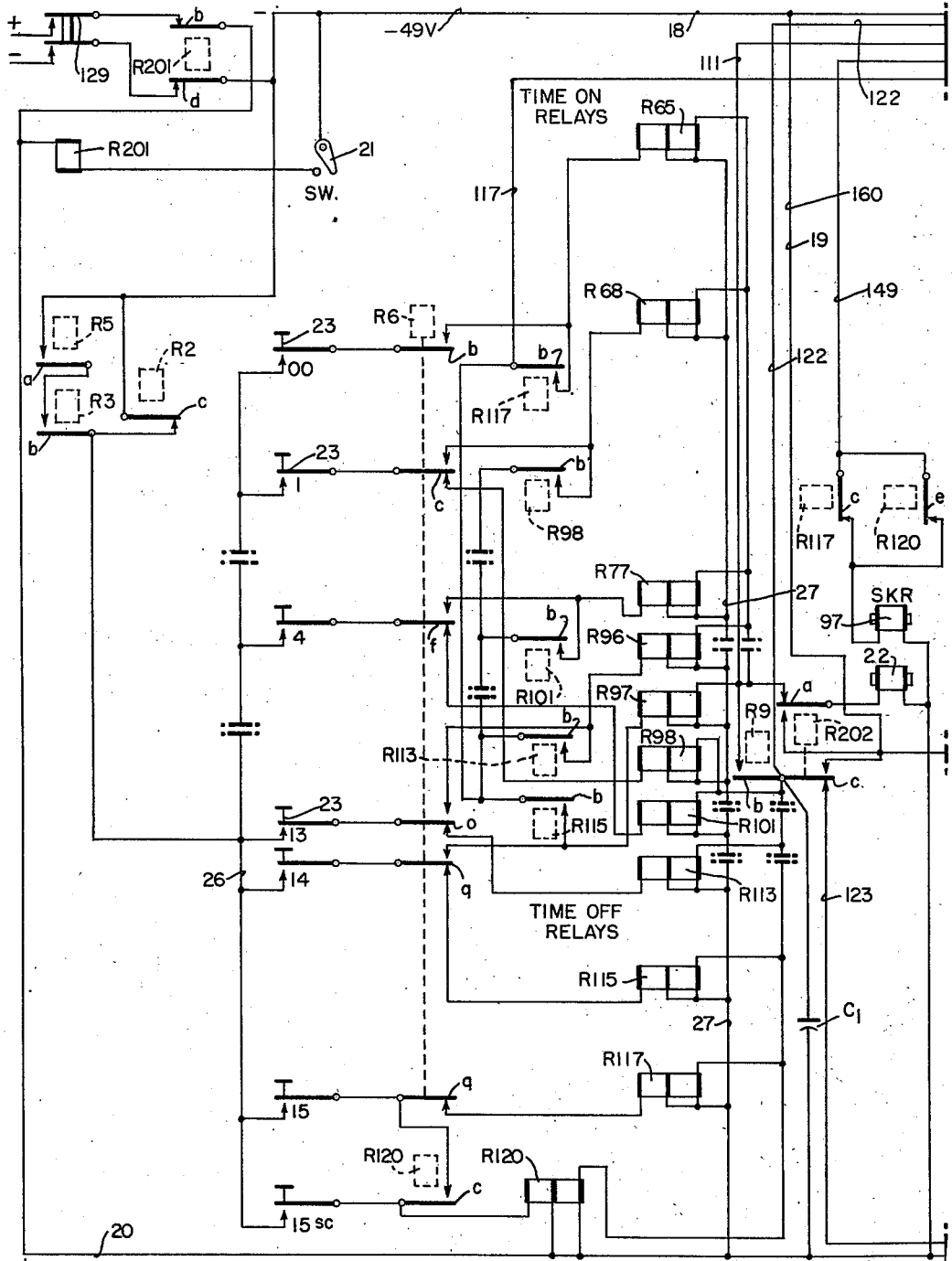
Figure 1B:
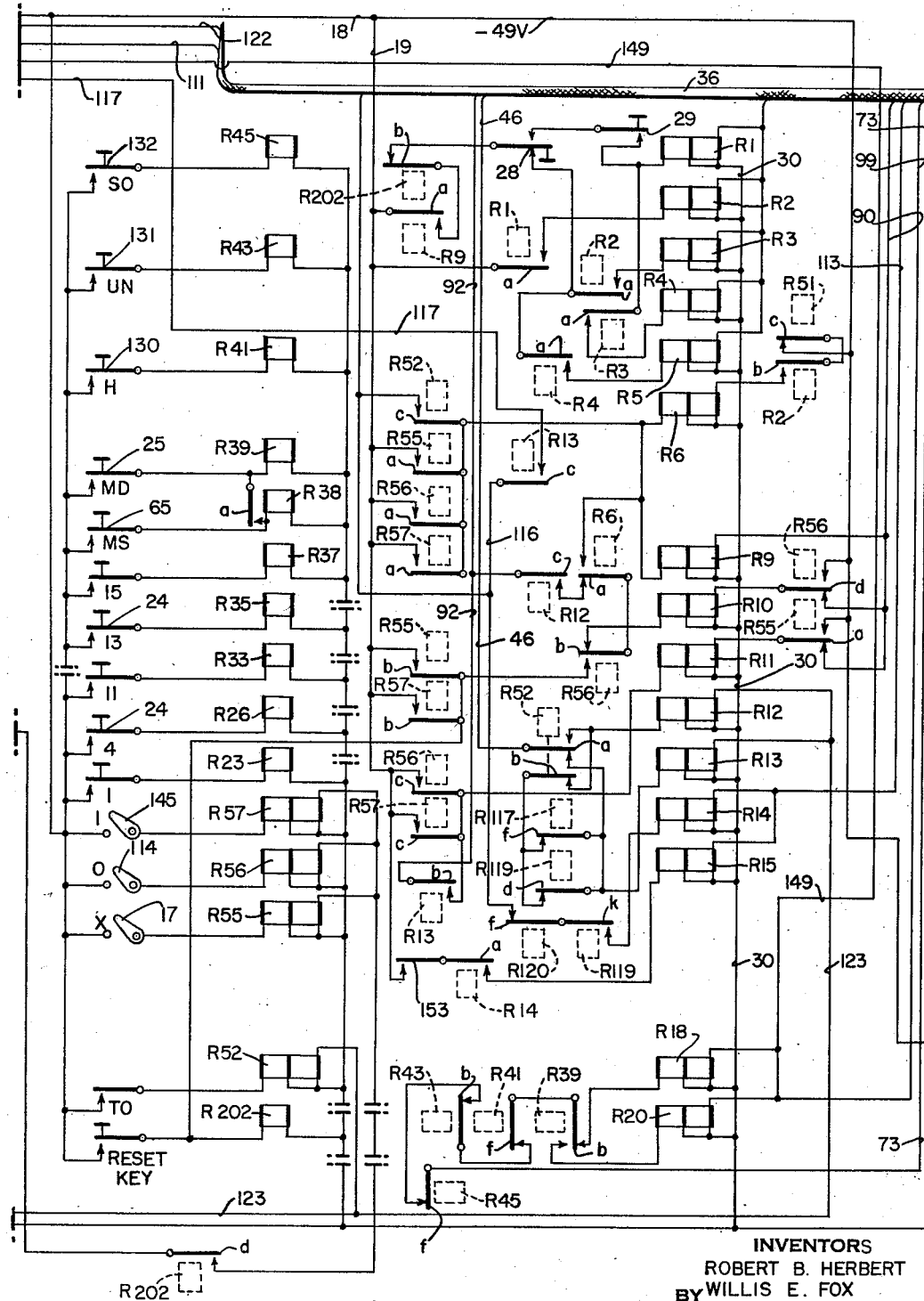
Figure 1C:
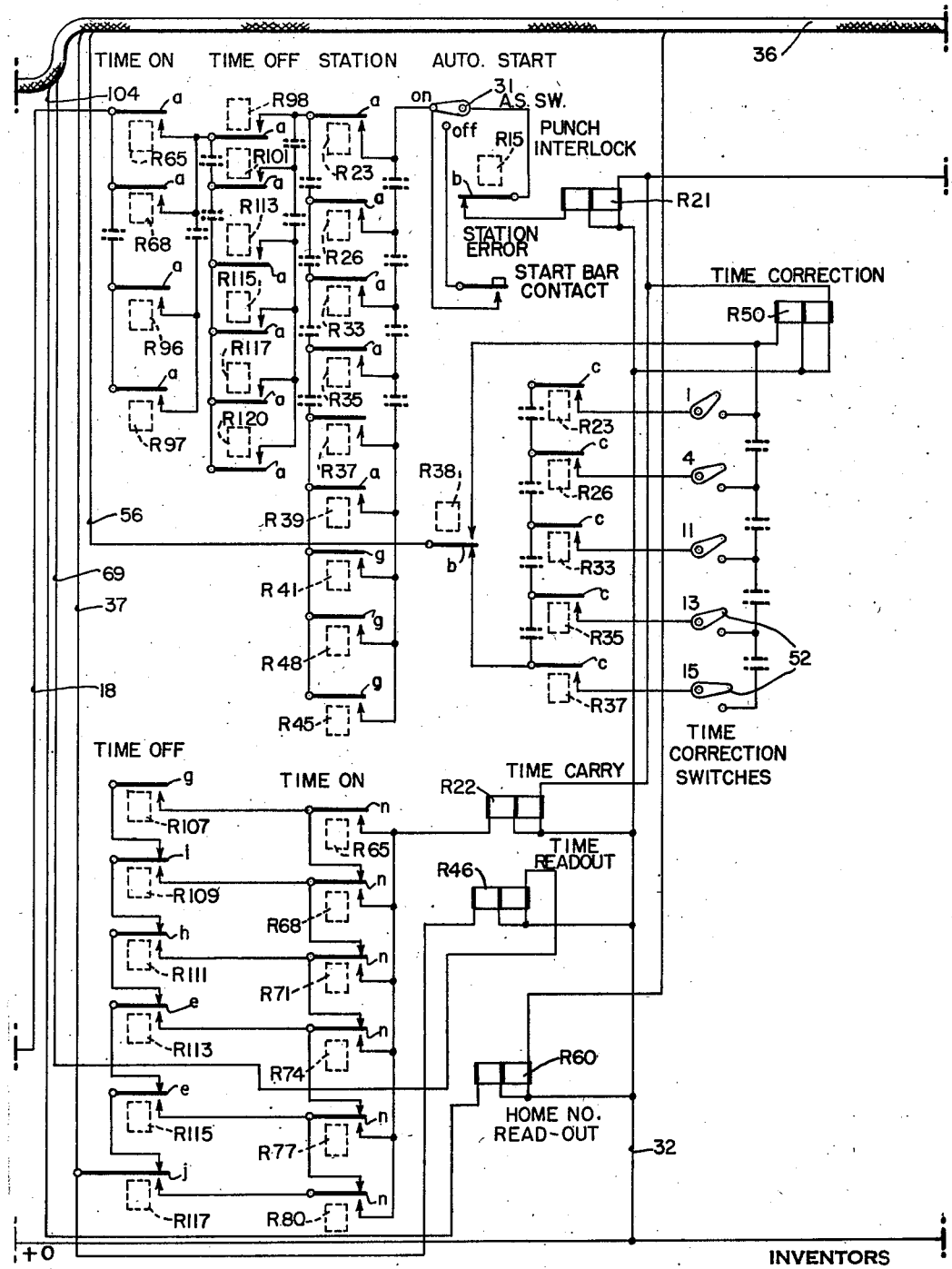
Figure 1D:
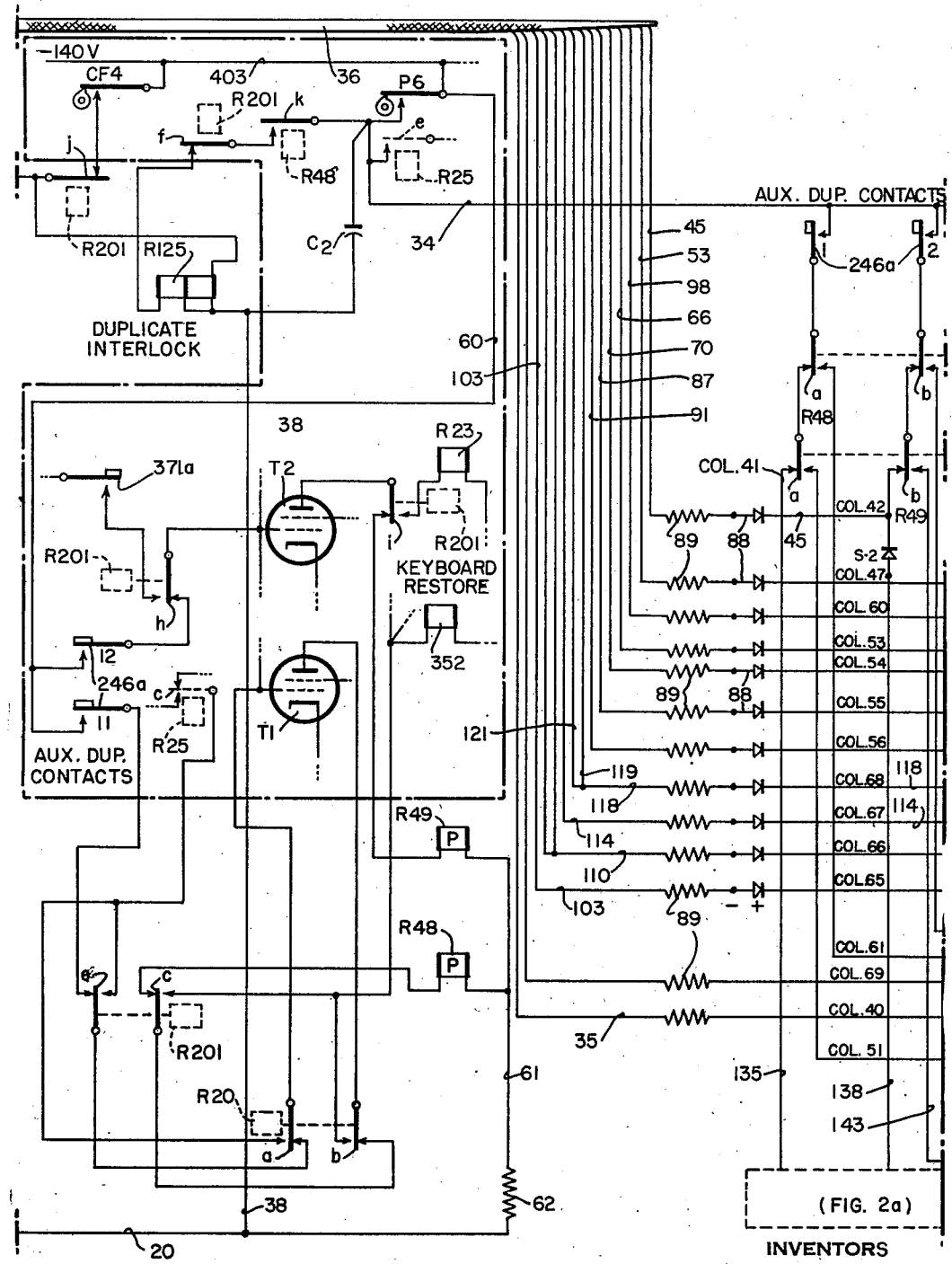
Figure 1E:
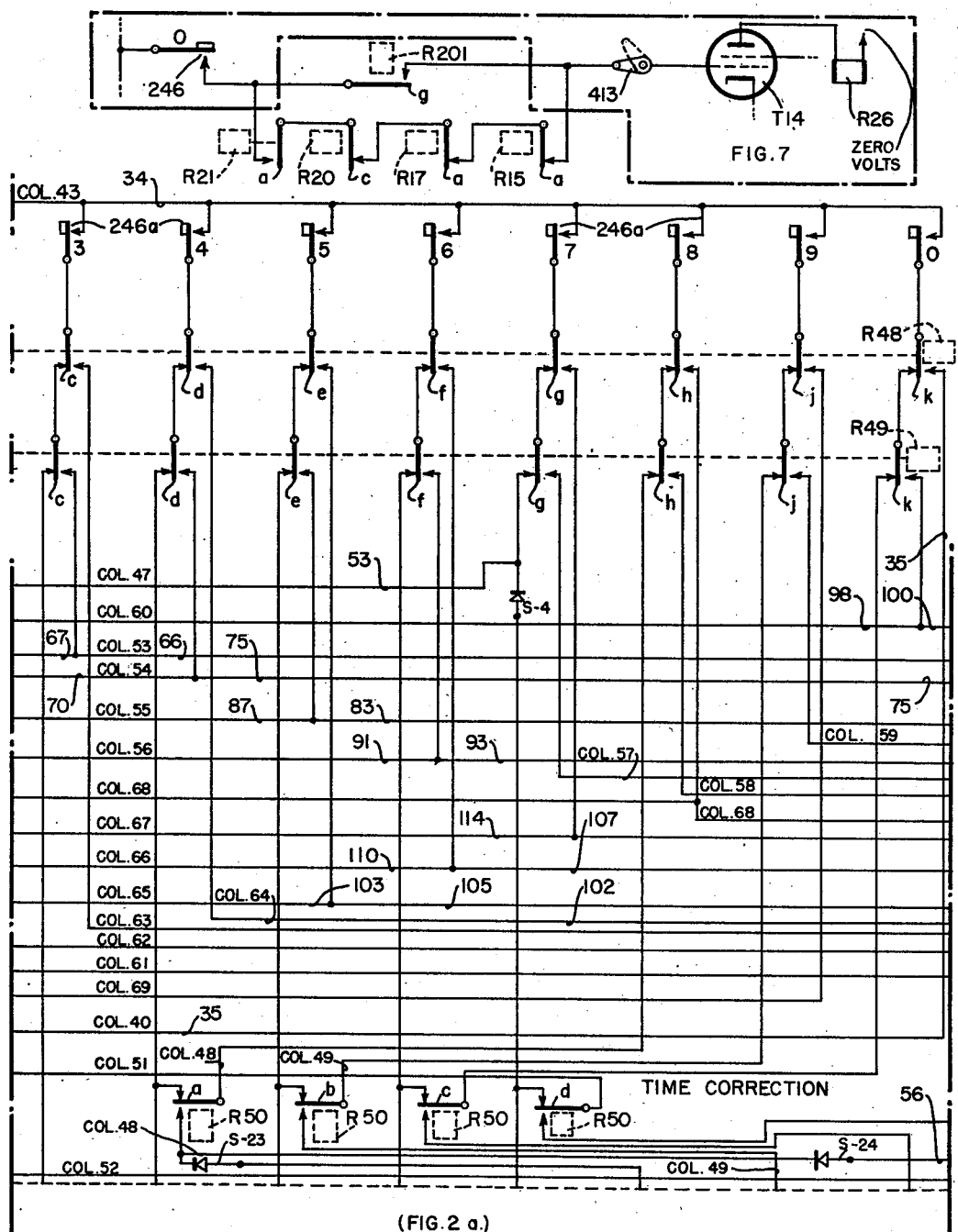
Figure 1F:
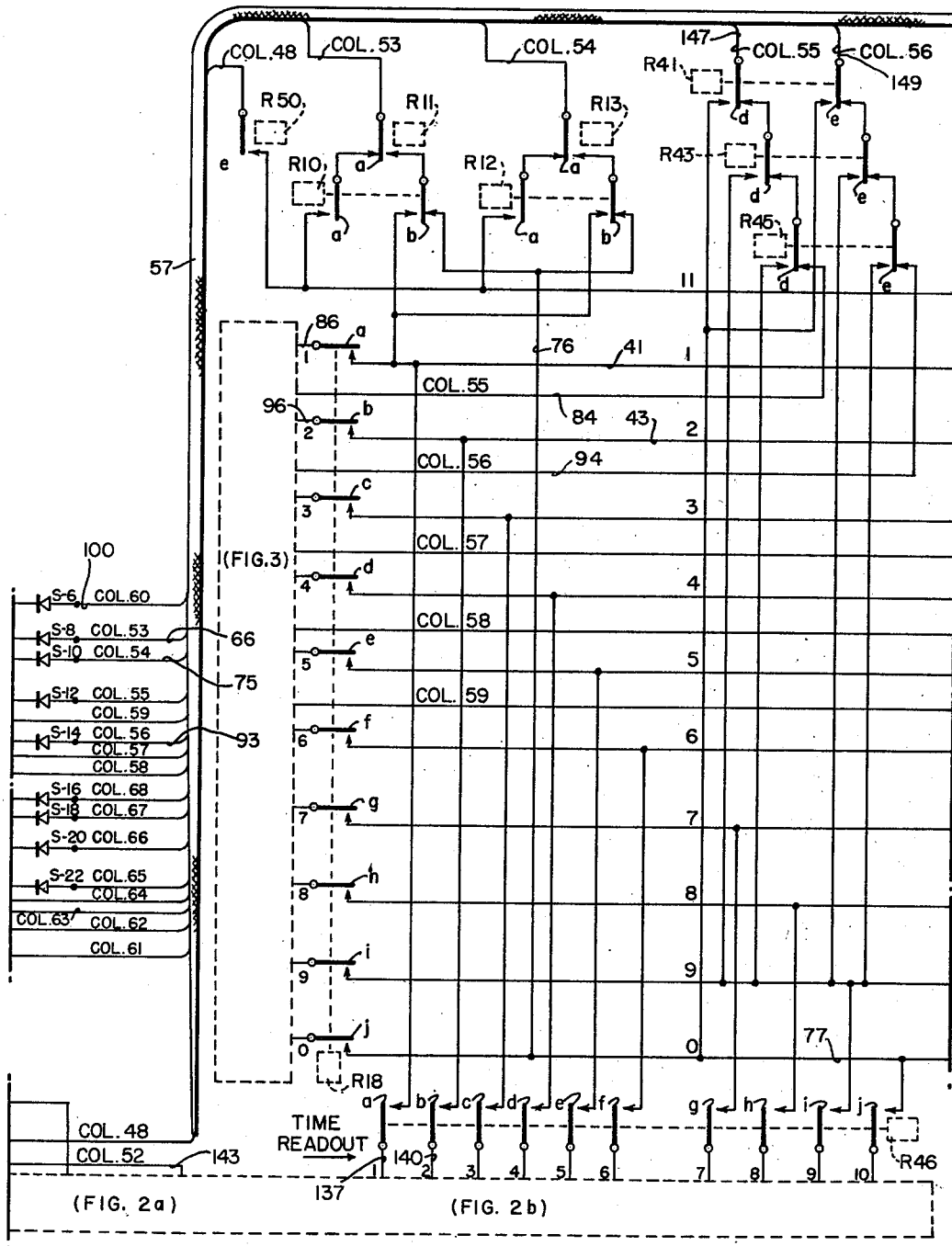
Figure 1G:
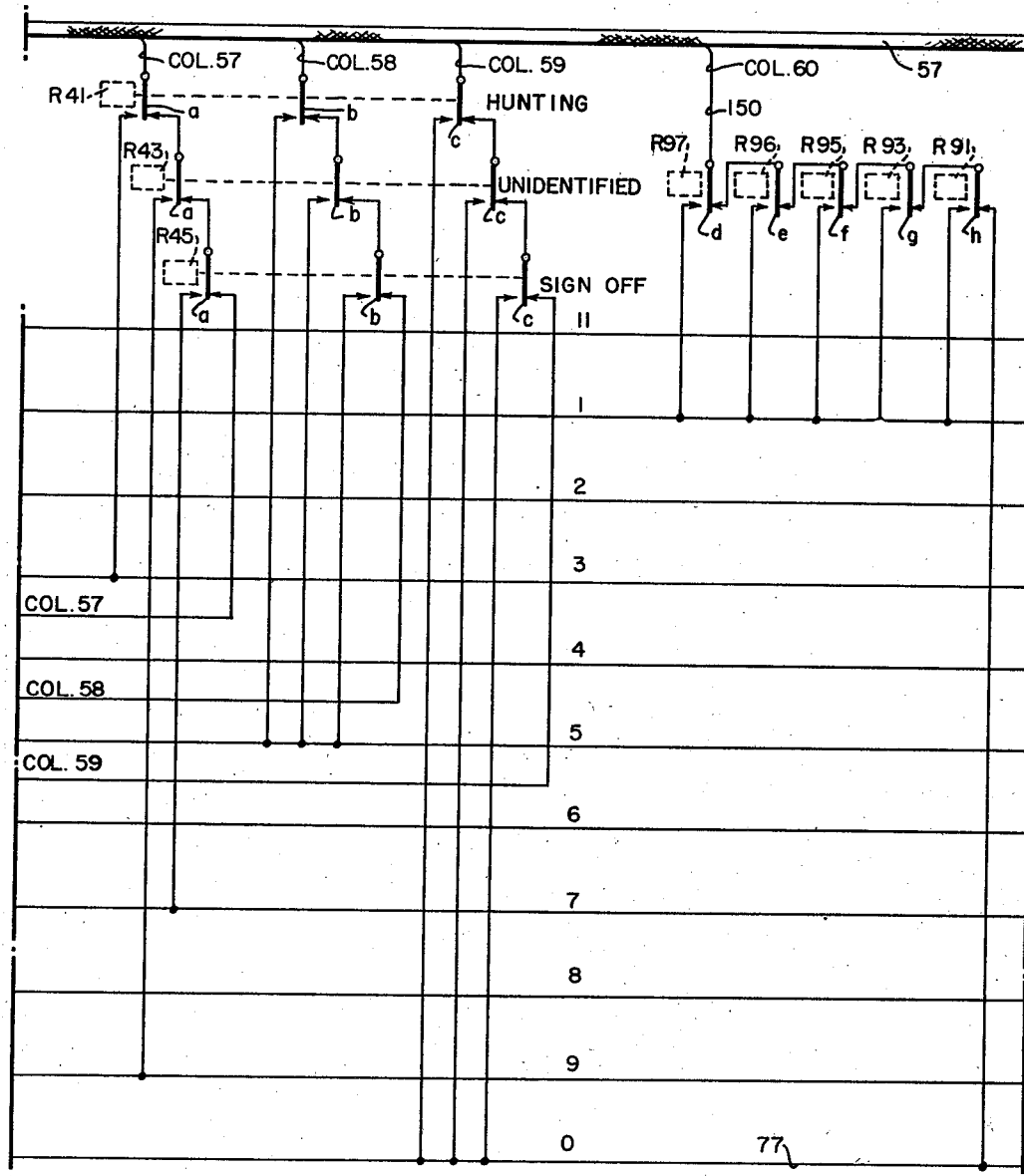
Figure 1H:
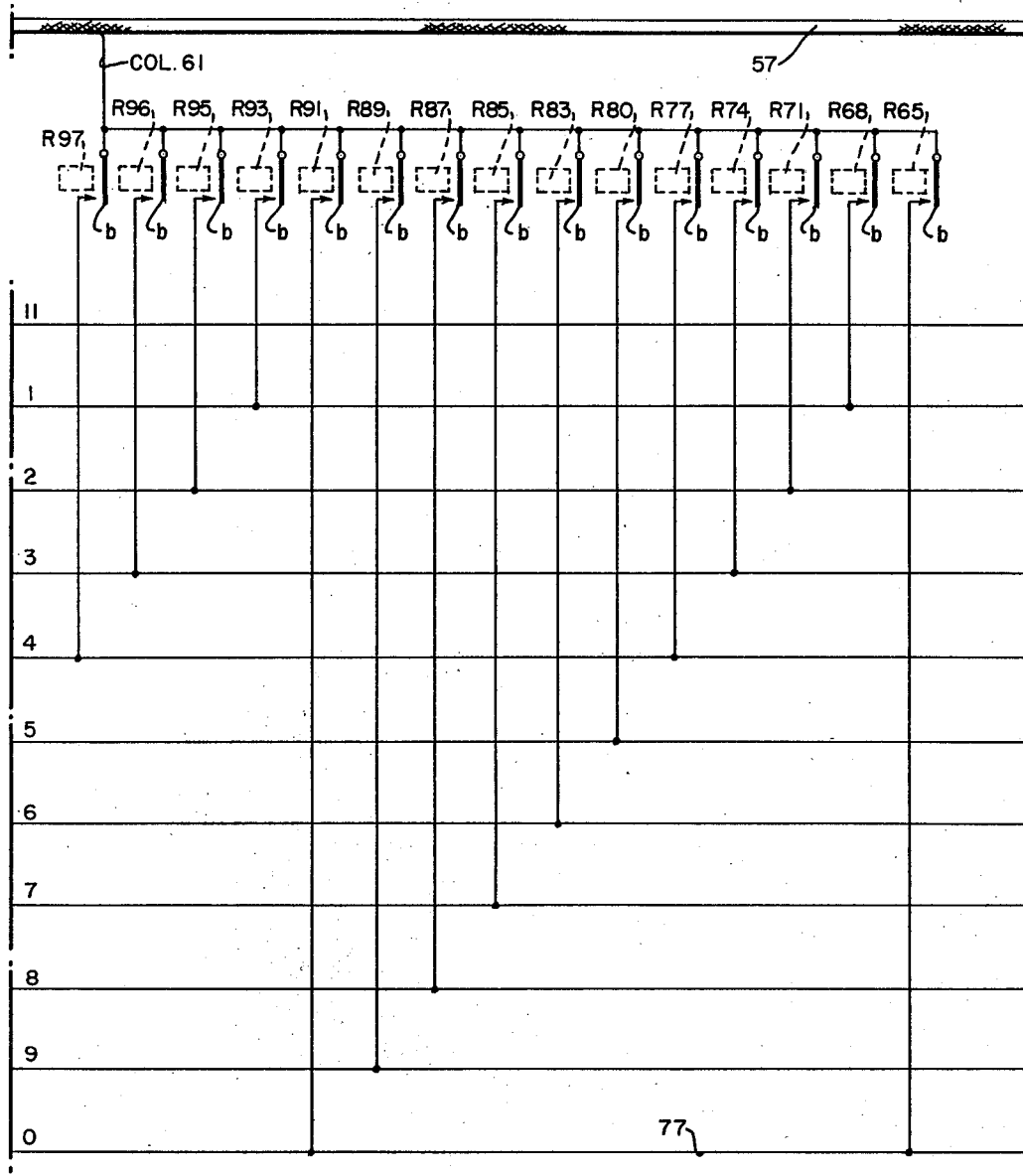
Figure 1J:
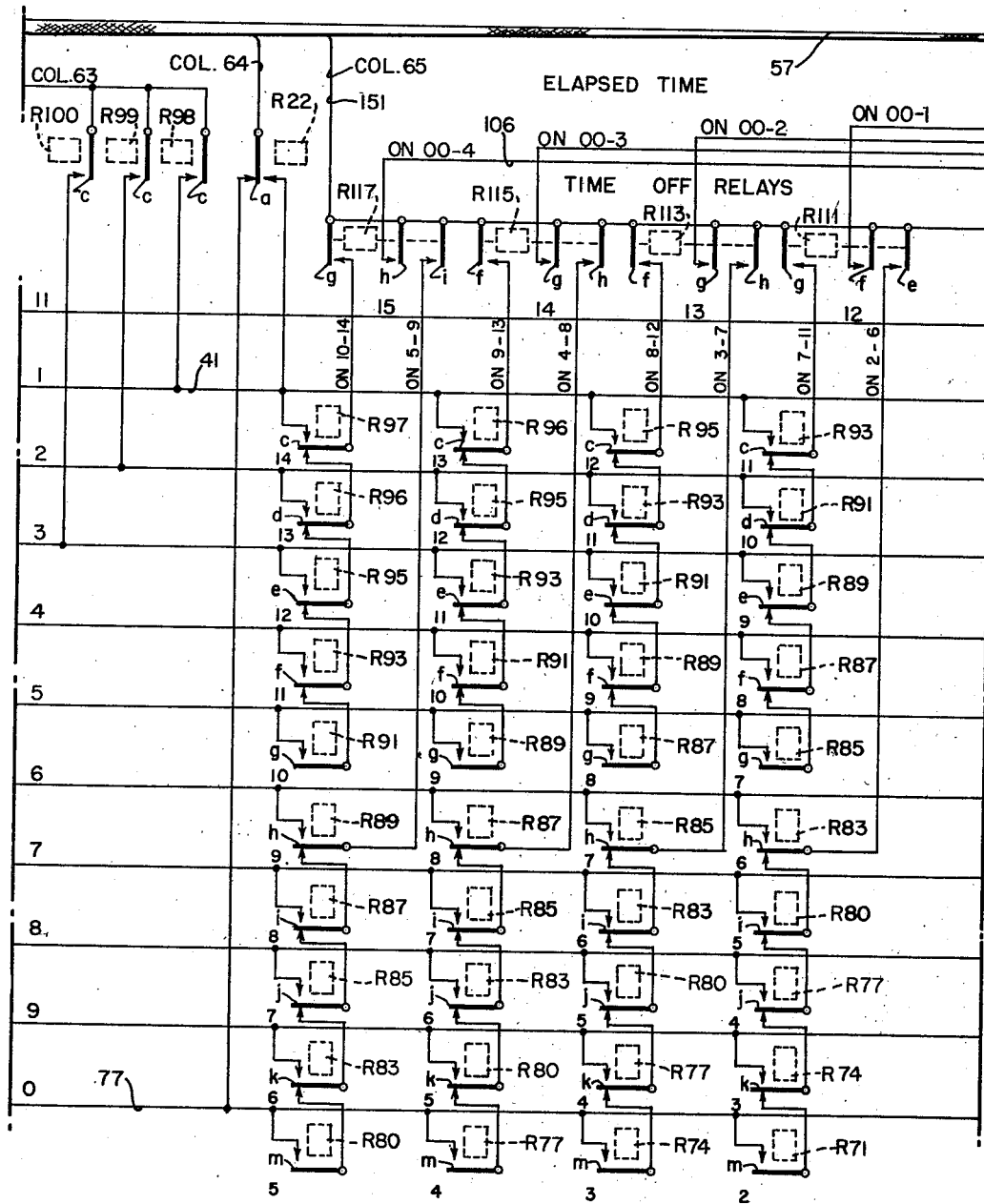
Figure 1K:
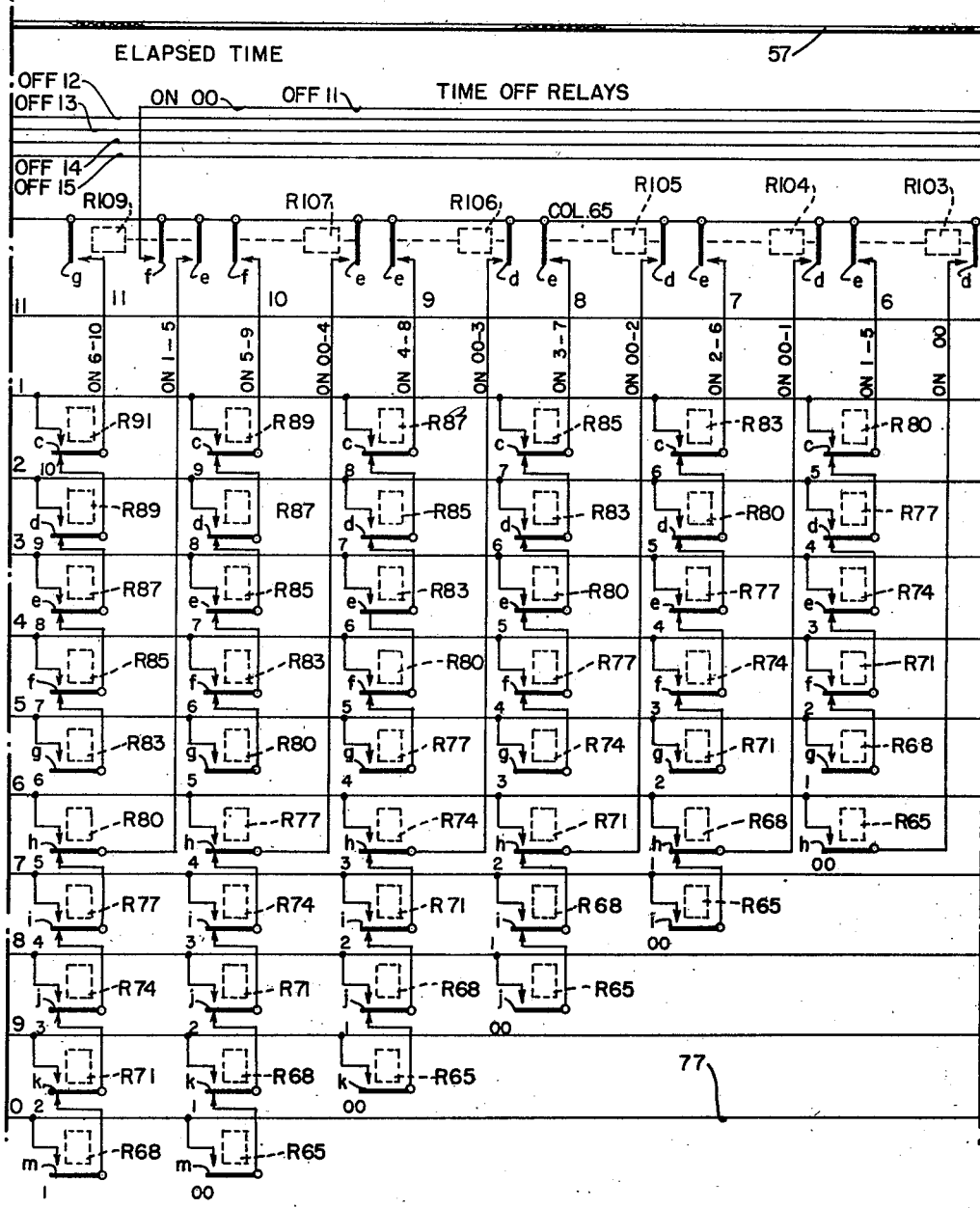
Figure 1M:
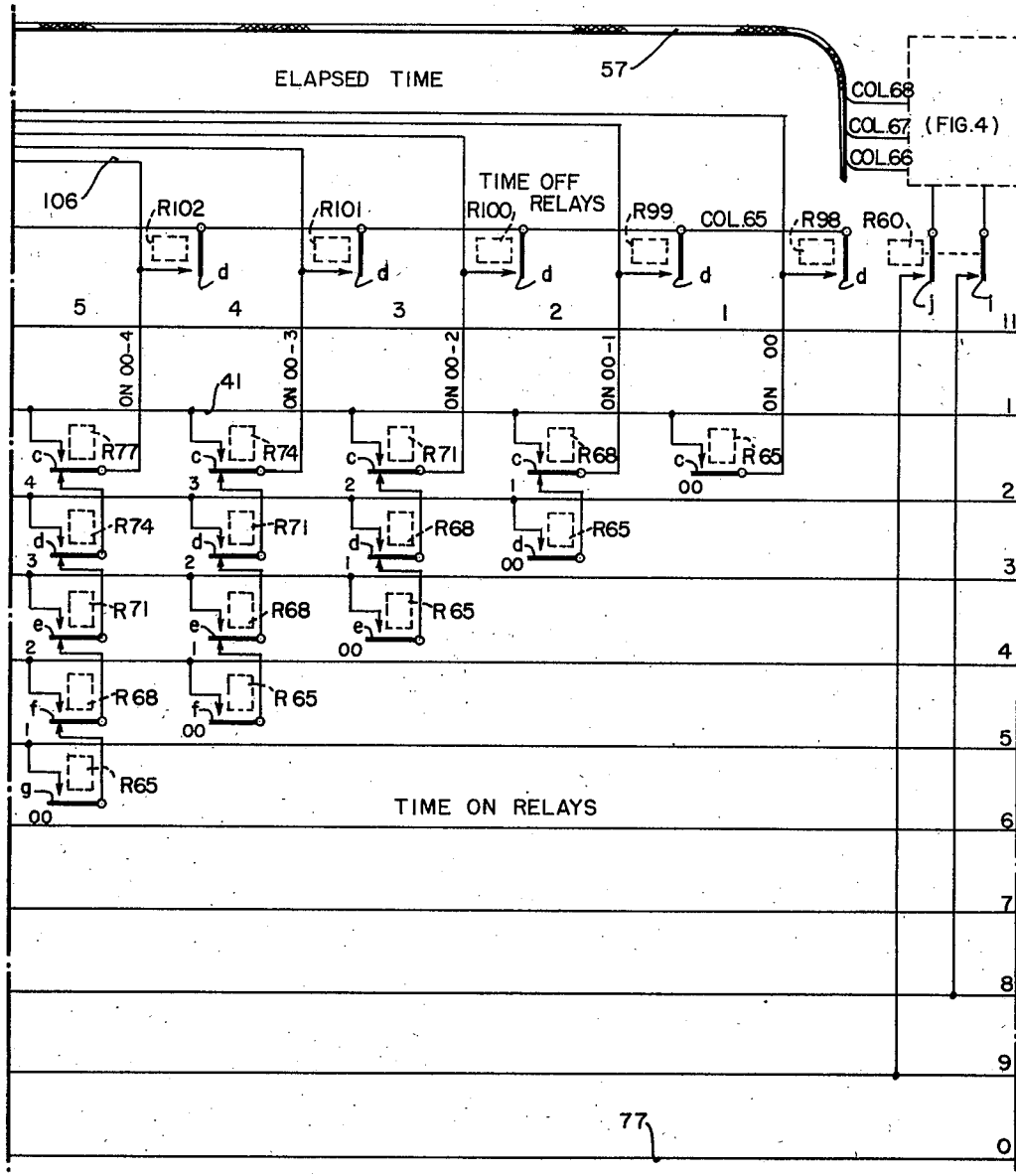
Figure 1N:
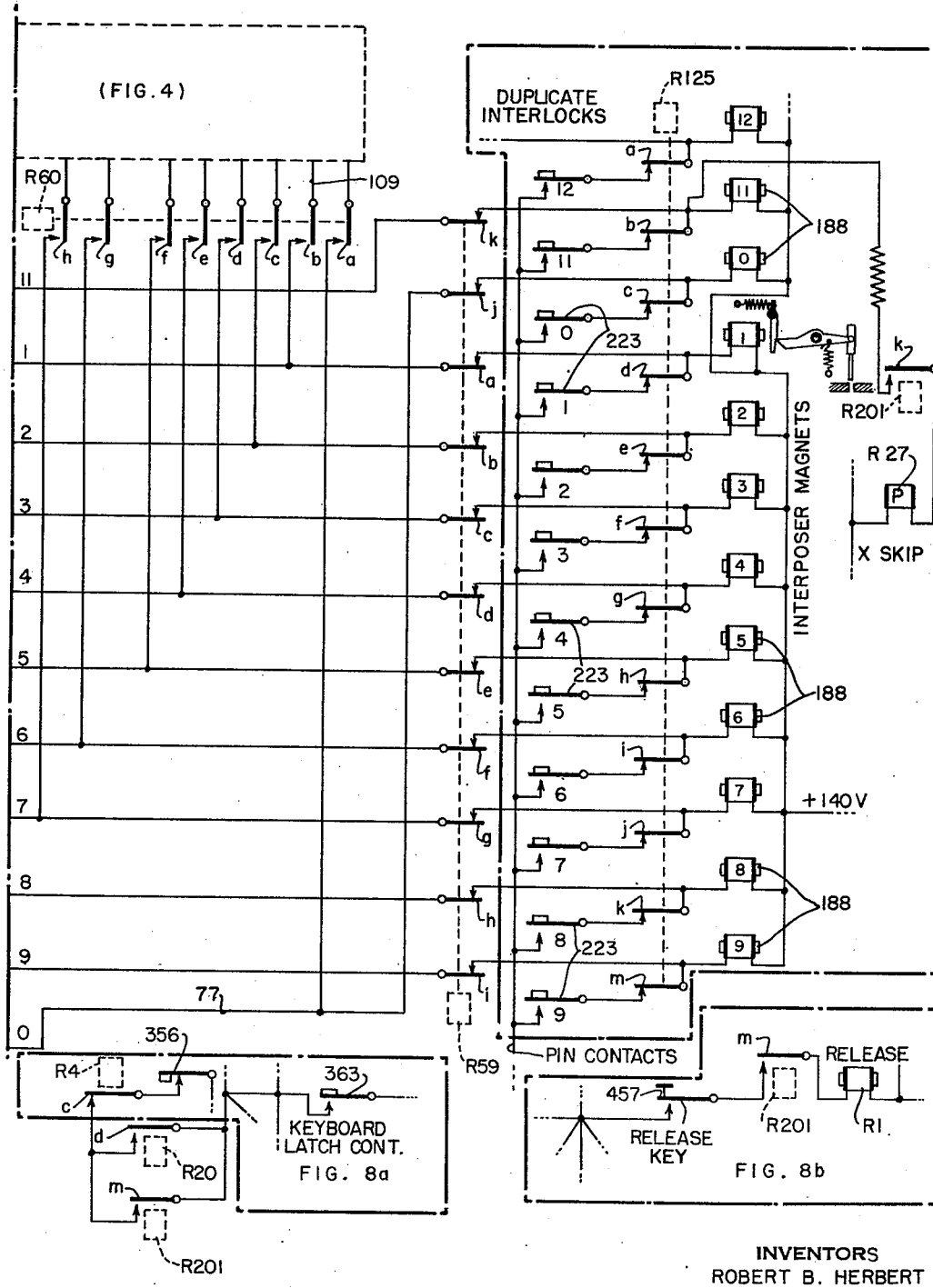

Before going into the details of a circuit herein disclosed, it may be noted that the apparatus enclosed in the various dash-dot boxes throughout Figs. 1a to 1n represent a portion of the circuit arrangement such as that disclosed in the patent application Serial No. 103,224, filed July 6, 1949, by E. W. Gardinor and A. B. Crowell, and which is commonly referred to as the "IBM 024 Card Punch," which is now commercially available. The Gardinor et al. circuit arrangement is illustrated in the accompanying drawings only sufficiently to enable the general operation as modified by the present invention to be understood and reference should be made, for a more complete description, to the above-mentioned patent specification. It is to be understood, of course, that similar circuits may be employed with the invention described and claimed herein without departing from the novel subject matter herein disclosed.

It is believed that the present invention may be best set forth by describing the invention as actually employed with the machine of the aforementioned application. In those instances where the circuit elements of the aforementioned application become effective in conjunction with the circuit arrangement of the present invention, the reference numbers used to identify such circuit elements in the aforementioned application will be used. When the switch 21 (Fig. 1a) is in an open position the punching machine described in the aforementioned application will operate in conjunction with the circuit arrangement described and claimed herein. When the switch 21 is in a closed position, the circuit arrangement of the present invention will be ineffective and the IBM 024 Card Punch will operate independently of the instant applicants' invention.

The present invention will now be described with reference to the transcribing of the data recorded on the tape 10, such as shown in Fig. 5, to a final record card 14 (Fig. 6). The record cards into which the data is to be transcribed are of the well known type having twelve horizontal rows of designation-receiving positions, 12, 11, 9, 8, 7, 6, 5, 4, 3, 2, 1 and 0, and 80 vertical columns which may be suitably numbered along the lower margin. The data which is to be punched in each column or columns is designated by the printed information appearing in the normal "11" and "12" positions of the record card.

Tape 10 is fed under a transparent index plate 11 (Fig. 5) which is scribed with a pair of indicia M and N which are spaced a distance apart equal to 15-minute travel of the tape in the original home receiver. The distance between the indicia are further divided into 5-minute increments. The plate is likewise marked with a series of horizontal lines vertically disposed and each of which is representative of a particular transmitting station as denoted by the numbers 1 to 15, inclusive.

Figure 4:
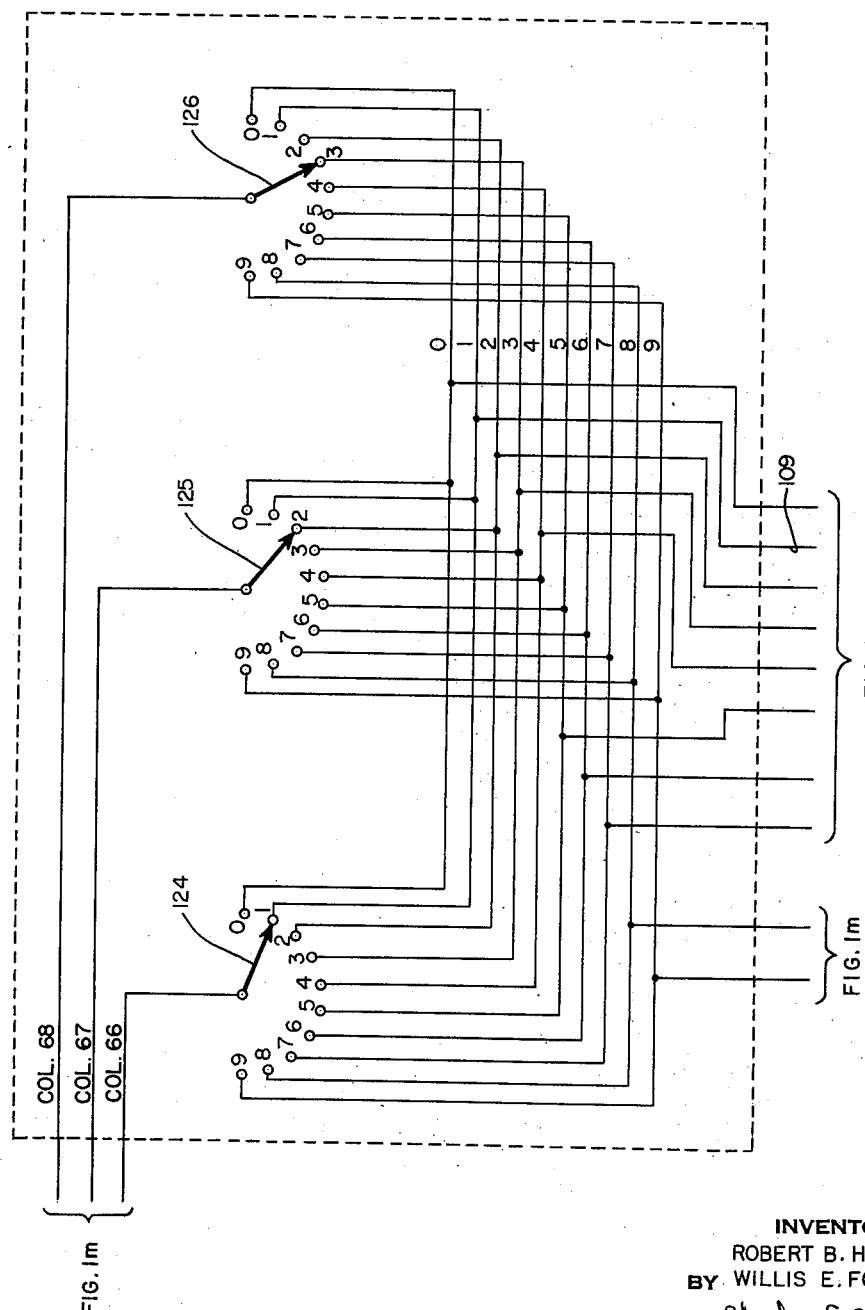
Figure 4 is a view of settable Home Number switches which are adapted to be successively read out.
Figure 11:
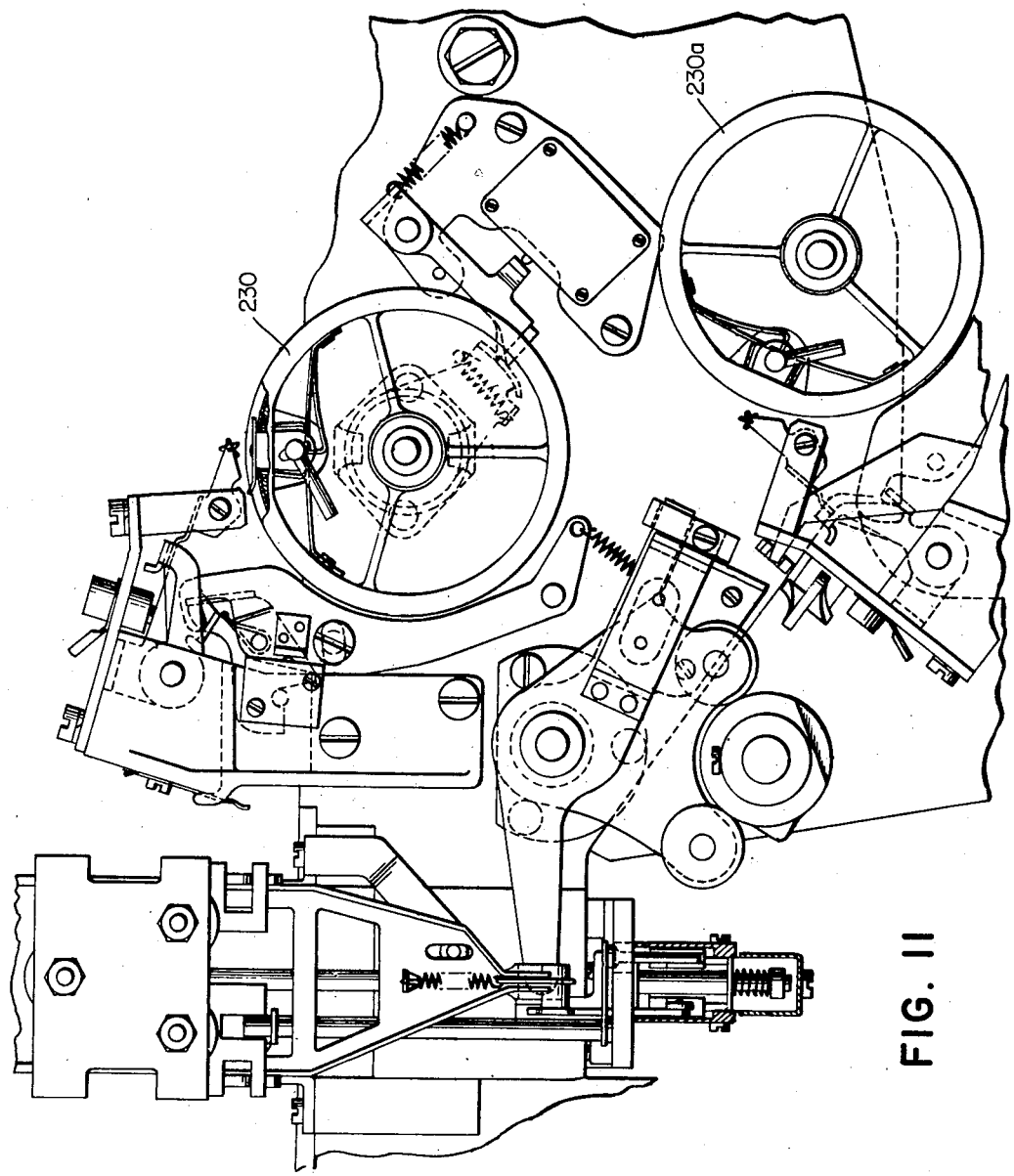

The operator, before feeding the tape 10, will note that the tape was installed in the receiver of Home Number 123 at 1:45 p. m. on December 8, 1950. Accordingly, he will set the switches 40 and 42 (Fig. 2a) to represent the month of December as denoted by the 12 setting on the two switches; set the switch 44 (Fig. 2a) to the "2" contacts position indicating that the 8th day of December occurred in the second week of December; set the switches 124, 125 and 126 (Fig. 4) so as to represent the Home Number 123, and set the switch 47 (Fig. 2a) to the "6" contacts position thereby indicating that the 8th day of December is the 6th day of the second week of December.

Figure 2A:
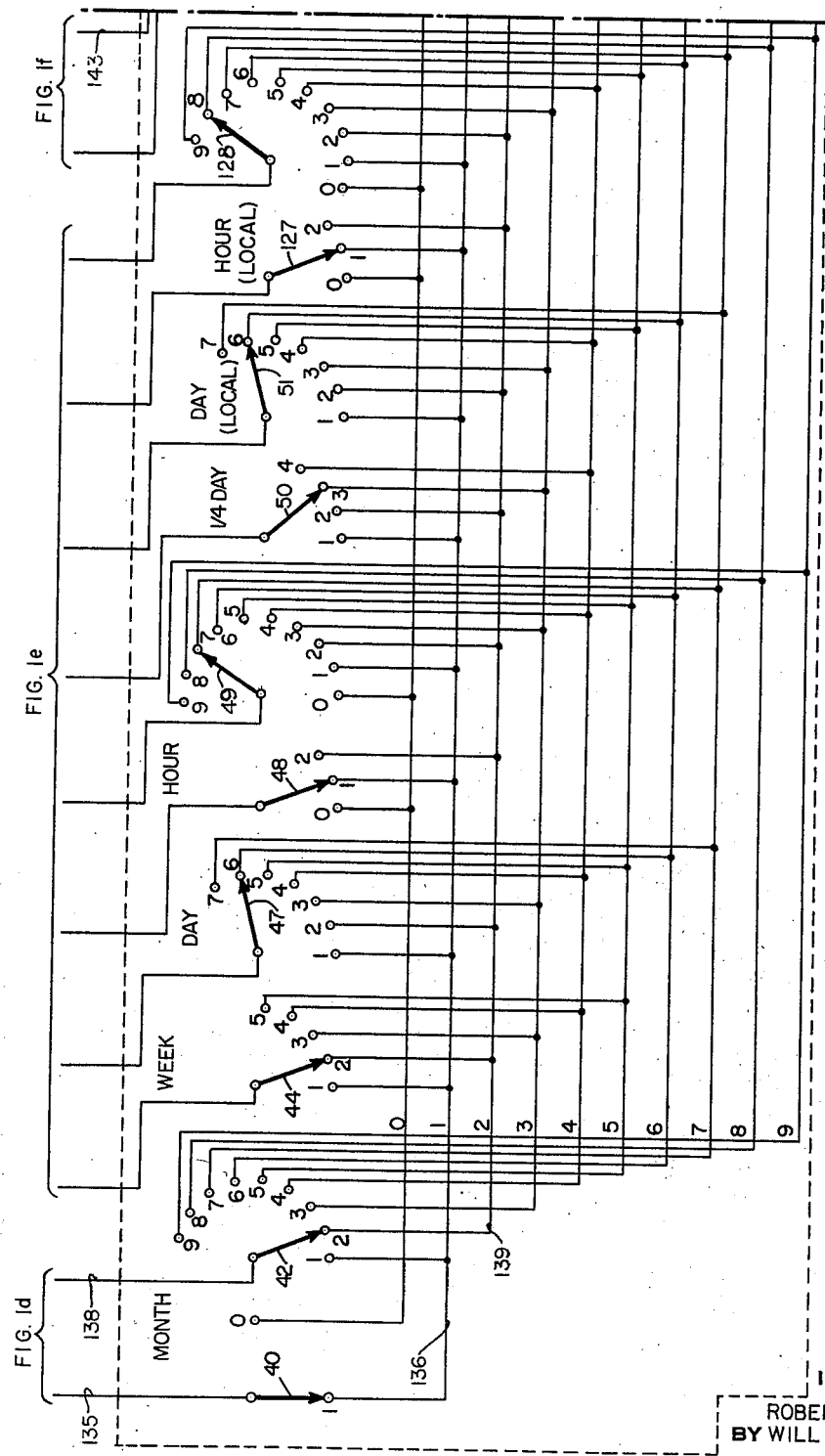

The operator will then cause the tape to be fed through periods of non-listening as represented by line 12 (Fig. 5) until a quarter-hour interval is visually detected during which time the set is tuned to a particular station. During such periods of continuous advancement the operator will note the number of quarter-hour intervals, as represented by the alternate markings 13 (Fig. 5) on the tape, skipped over from the starting point of the tape for the purpose of setting the hour switches 48 and 49 (Fig. 2a) and the one-quarter day switch 50 (Fig. 2a).

The operator will deduce from the tape that the set was tuned on from silence during the first quarter-hour past five o'clock in the evening and will set the switches according to a twenty-four hour time basis where midnight is considered to be the origin and each hour thereafter is successively assigned a number to designate the time of day such that 12 o'clock noon will be represented by the number 12 and 9 o'clock in the evening will be represented by the number 21, for example. Thus the switch 48 will be set in the "1" contacts position, switch 49 will be set in the "7" contacts position, and the quarter-day switch will be in the "3" contacts position.

If the tape 10 indicates a station tuned in which is operating from a community or section of the country on daylight saving or advanced time, then the switches 47, 48, 49 and 50 will be set according to standard time, while the switches 51, 127, 128 (Fig. 2a), and 64 (Fig. 2b) would be set to the daylight or advanced time. The switch 51 would be set to indicate the day, the switches 127 and 128 set to indicate the hour, and the switch 64 set to indicate the quarter-day, each according to daylight saving time.

The operator will then wrap the program cards 15 (Fig. 9) and 16 (Fig. 10) around the program drums 230 and 230a (Fig. 23 of the Gardinor et al. application and Fig. 11 here) and place the detail cards 14 of the type shown in Fig. 6 in a hopper. The program card 15, which in conjunction with the program card 16 controls the automatic operation of the punch, is perforated as shown below and in Fig. 9 with the codes having substantially the same significance as that set forth in the Gardinor et al. application.

| Column Number | Positions Perforated | Operation |
|---|---|---|
| 1 | X | Skip. |
| 2–39 | 12 | Skip continued. |
| 40 | 0–1 | Space. |
| 41 | 0 | Do. |
| 42–54 | 12 | Space continued. |
| 55 | 0 | Space. |
| 56–58 | 12 | Space continued. |
| 69 | 0–1 | Space. |
| 70 | X | Skip. |
| 71–80 | 12 | Skip continued. |

The program card 16 (Fig. 10) which is mounted on the duplicating drum 230a (Fig. 17 of the aforementioned patent application) functions as an emitter in the present invention and it is punched as shown in Fig. 10.

Next, the operator will supply a source of potential to the Gardinor et al. machine by closing the switch 400 (Fig. 47a of the Gardinor application, and a source of potential to the applicants' machine by closing the switch 129 (Fig. 1a). The switch 400 upon being closed will, as brought out in the Gardinor application, cause the leading record card to be brought into position such that it is registered at the zero column thereof while the program cards 15 and 16 are in column one position. The closing of the switch 129 (Fig. 1a) will couple the conductors 18 and 20 (Fig. 1a) to the respective negative and positive terminals of a source of power (not shown). The circuit arrangement of the instant invention will be coupled to the switch 400 (Fig. 47a of Gardinor application) through an associated rectifier network (not shown) necessary to produce the required voltage and the switch 29.

With program card 15 now in column one position, the associated star sensing wheel will sense the perforation in the "11" index point position causing a skip over that column which is continued by the "12" index point perforations in columns 2–39 of the program card 15, much in the manner as described in the Gardinor application. As a result, the detail card will now be in column 39 position while the program cards 15 and 16 will be in column 40 position, with the corresponding star-wheels sensing the "0" and "1" perforations in the program card 15 and the "11" and "0" perforations in the program card 16.

It is believed appropriate at this time to point out that the switch 21 (Fig. 1a) when closed, will set up a circuit for energizing the relay R201 (Fig. 1a) for the purpose of rendering the circuit arrangement of the present invention ineffective. The relay R201 will effectively operate upon the associated contacts R201b, R201d (Fig. 1a), R201e, R201f, R201g, R201h, R201i, R201j (Fig. 1d), R201k (Fig. 1n), R201m (Fig. 8b), and R201n (Fig. 8a) to render the applicants' circuit arrangement ineffective, and to enable the Gardinor et al. machine to operate independently.

Figure 3:
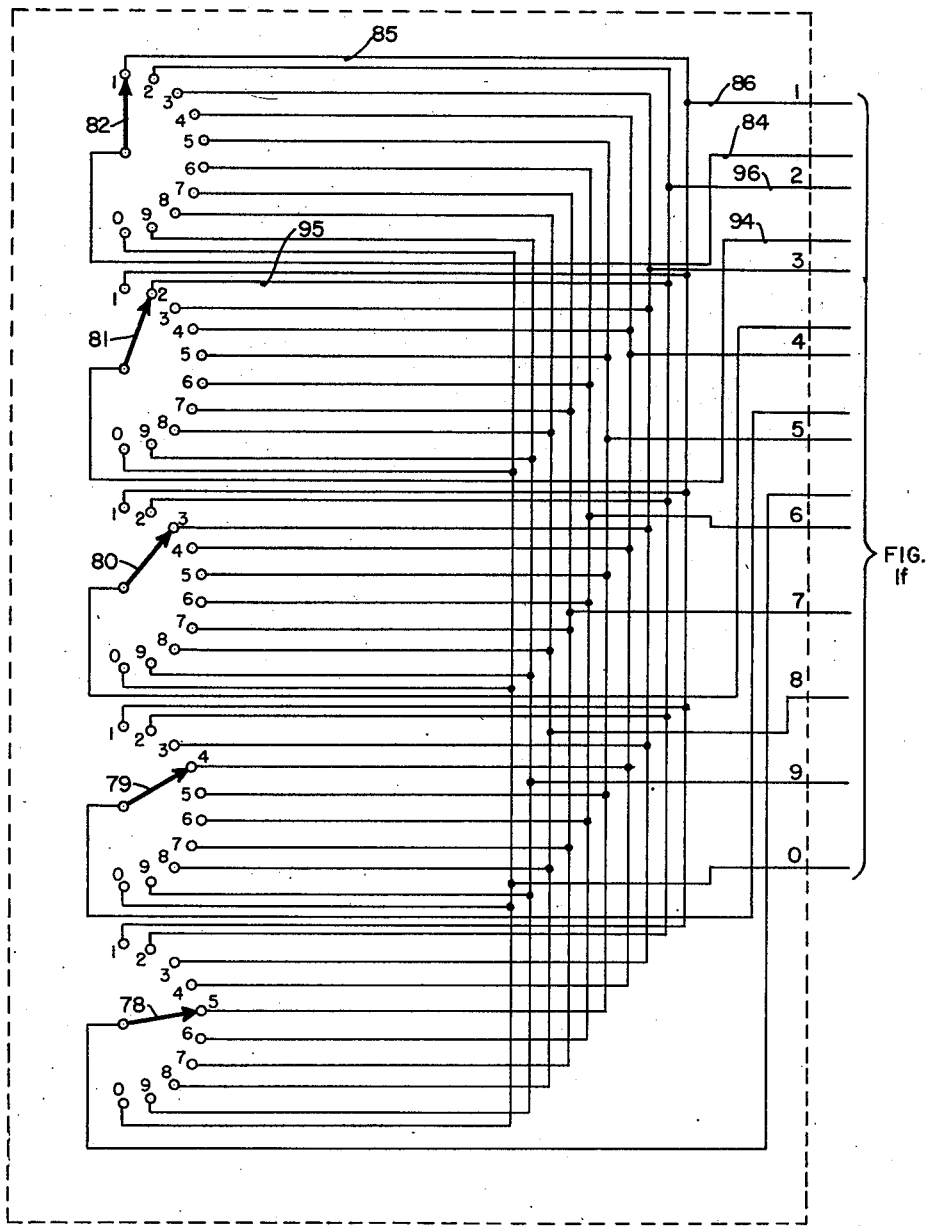
Figure 3 is a view of settable station switches which are adapted to be successively read out.

Now with the beginning of the quarter-hour interval marker 13 (Fig. 5) in line with the mark M on the plate 11, the operator visually observes that the receiver was tuned on from silence, as represented by line 12, to station 13 at 5:04 p. m., where the hour would be deduced by adding the number of quarter-hour markers 13 between the start of the tape and the point M. The operator will then manually set each of the respective station switches 82, 81, 80, 79 and 78 (Fig. 3) to a predetermined position which is representative of station 13, such as shown in Fig. 3.

With all the manual data now properly entered, the operator will, in observing that the set is tuned on from silence, close the spring type switch 17 (Fig 1b) causing the energization of the latch type relay R55. The energization of the relay R55 will cause the contacts R55a (Fig. 1b) to be closed thereby enabling a circuit to be established for energizing the relays R6 and R9. This circuit may be traced from the low side of a power supply source as follows: line 18 (Fig. 1b), line 19, contacts R55a now closed, relays R6 and R9 in parallel, line 30, to the line 20 coupled to the high side of the power supply source which is not shown. The contacts R55b (Fig. 1b) upon being closed, will enable a circuit to be completed therethrough to energize the reset relay R202, while the now transferred contacts R55c will complete a circuit for energizing the trip coil of the relay R11 thereby unlatching any associated contacts thereof. The energization of the relay R6 will close the contacts R6a (Fig. 1b) thereby continuing the circuit established through contacts R55a to the relay R10 causing the same to be energized. As shall be seen subsequently, the relay R10 in an energized state will, when the program cards 15 and 16 are in column 53 position, enable a circuit to be completed for punching an "X" in column 53 of the record card thereby indicating that the receiver was tuned in from a silent condition.

If the tape 10 had shown that the receiver was tuned to the same station instead of being tuned from silence, then the switch 144 (Fig. 1b) would have been closed causing the relay R56 (Fig. 1b) to be energized. Thus when all the required data are entered, the relay R11 will be energized in a manner similar to that described for energizing relay R10. The energization of relay R11 would, when the program cards 15 and 16 are in column 53 position, enable a circuit to be completed for punching a "0" in column 53 of the record card thereby indicating that the receiver was tuned in from the same station.

If the tape 10 had indicated that the receiver was tuned in to a different station, then the switch 145 (Fig. 1b) would be closed causing relay R57 (Fig. 1b) to be energized. The energization of relay R57 would then cause relays R10 and R11 to be energized thereby enabling a circuit to be completed when the program cards 15 and 16 are in column 53 position for punching a "1" in column 53 of the record card thereby indicating that the receiver was tuned in from a different station.

With the reset relay R202 in an energized position, the contacts R202d (Fig. 1b) will close, which sets up an obvious circuit for energizing the trip coil of the relay R55 thereby unlatching the contacts of relay R55. The unlatching of the contacts R55b will restore relay R202 to an un-energized position. While relay R202 is energized a circuit will be completed for energizing the trip coils of the Time On relays (Fig.

1a) which may be traced from the conductor 18 (Fig. 1a) as follows: line 160, contacts R202c now transferred, R9b now closed, the trip coils of the Time On relays (Fig. 1a), line 27 to the conductor 20, thereby causing the contacts associated with these relays to unlatch at this time. There is one Time On relay repesentative of each of the 14 minutes of the 15 minutes in a quarter-hour interval. In Fig. 1a, only five Time On relays are shown. Likewise with R202 being in an energized condition, a circuit will be established through the contacts R202a (Fig. 1a) for energizing the time key restore magnet 22 (Fig. 1a) which will unlatch any of the time keys 23 (Fig. 1a) which may be in a latched position.

The operator will then depress the 13 station key 24 (Fig. 1b) which will establish a circuit for energizing the relay R35. The station keys 24 are adapted to be latched down, when depressed, until after the station field is punched in the card being set up, or for periods of continuous listening on the same station, will remain latched down until after punching the station field of the next card representing a station change.

There are 15 station keys 24 which are representative of the field over which a survey is to be made. If it is desired to survey more than the 15 stations, then the extra stations may be punched in the card by depressing either the manual standard (MS) key 25 on the manual daylight (MD) key 26, depending on whether the station is operating in a daylight or standard time zone. With this type of operation the machine will stop when the station field (columns 55, 56, 57, 58 and 59 of card 14) is reached permitting manual punching of the code numbers representative of the particular station. After the last column is punched in the station field, automatic punching under control of the program cards will be resumed.

The remaining station functioning keys are the hunting key 130, the unidentified key 131, and the sign off key 132 (Fig. 1b) which are used to record station tuning functions which cannot be covered by any one of the regular 15 station keys 24 and the manual keys 25 and 65. The hunting key 130 is depressed whenever a pattern similar to the curve tracing 133 of Fig. 5 is to be transscribed. When these keys are used for station selection they will cause a special code to be punched into the station field columns 55–59 of the record card.

Continuing with the assumed problem, since the home receiver was tuned in at 5:04 p. m., the operator then depresses the 4 time key 23 (Fig. 1a) which will cause a circuit to be established from conductor 18 (Fig. 1a), contacts R2c normally closed, line 26, 4 key contacts 23 now closed, contacts R5f transferred, latch relay R77, line 27 to the conductor 20, causing the relay R77 to be energized and the associated contacts latched in position.

The depression of the 4 time key 23 will momentarily transfer the bail contacts 28 (Fig. 1a) and close the bail contacts 29 (Fig. 1a) causing a circuit to be completed from conductor 19 (Fig. 1b), contacts R9a now closed, R202b normally closed, contacts 28 shifted, contacts 29 now closed, relay R1, line 30 to the conductor 20. This completed circuit causes relay R1 to be energized and the associated contacts R1a to be closed which, in turn, completes a circuit for energizing the relay R2 (Fig. 1b).

With the contacts R2b (Fig. 1b) now closed, a circuit will be completed from line 18, contacts R51c normally closed, R2b now closed, trip coil of relay R6, conductor 30, and then to conductor 20 to unlatch the contacts of relay R6.

The contacts R2c (Fig. 1a) being opened with the energization of relay R2 breaks the time key common circuit. At this time the bail contacts 28 have been returned to the normal position thereof which enables a circuit to be set up through the now closed contacts R2a (Fig. 1b) for energizing the relay R3. The contacts of relay R3, as in the case of relays R1 and R2, are latched in a make position when the relay R3 becomes energized.

Since the operator observes from the tape that station 13 was still tuned in at the end of the quarter-hour interval, the 15 time key 23 (Fig. 1a) will be depressed, but inasmuch as R2c is now open, no circuit is completed to the corresponding Time Off relay. But as in the case of the 4 time key 23, the bail contacts 28 are momentarily shifted and bail contacts 29 are closed causing the energization of relay R4 (Fig. 1b) through the now closed contacts 29 and R3a, inasmuch as the relays R1, R2 and R3 are in an energized condition at this time. Thus with contacts R4a (Fig. 1b) now closed, a circuit will be completed to energize relay R5 (Fig. 1a) when the bail contacts 28 are restored to the normal position thereof. The energization of relay R5 closes the corresponding contacts R5a (Fig. 1a) thereby enabling a circuit to be completed from conductor 18 (Fig. 1a) through the now closed contacts R5a and R3b, 15 time key contacts now closed, Time Off relay R117, conductor 27 to the line 20.

If there had been a change in stations at 5:15 p. m., instead of continued listening, then the operator would depress the 15SC station change time key in place of the 15 time key 23.

Thus with the information containing the time the receiver was turned in to a particular station which was still being listened to at the end of the one quarter-hour interval now entered, a circuit will be established for energizing the relay R21 (Fig. 1c). This circuit may be traced as follows from conductor 18 (Fig. 1c): Time On contacts R77a, Time Off contacts R117a, station contacts R35a all now closed, auto-start switch 31, contacts R15b now closed, relay R21, conductor 32 to the line 20.

If the auto-start switch 31 is in an open position, the energization of relay R21 with the contacts R77a, R117 and R35a, all closed, may be brought about by manually closing the start bar contacts 33 (Fig. 1c).

It is to be noted that the Time On relay contacts, the Time Off relay contacts, and the station relay contacts are intercoupled in a network fashion such that a circuit will be completed therethrough to energize the latch type relay R21 (Fig. 1c) only when one Time On, Time Off, and station relays are energized. It is also pointed out that the program cards 15 and 16, after skipping to column 40 position, remain in that position and are ineffective as controlling instrumentalities until the relay R21 becomes energized.

With the relay R21 now energized and the corresponding star-wheels sensing the perforations in the "0" and "1" index positions of column 40 of the program card 15 and the "X" and "0" perforations in the corresponding column of program card 16, a circuit will be completed for spacing the cards to column 41.

With the "0" star-wheel contacts 246 (Fig. 7) associated with program card 15 closed when R21 becomes energized, a circuit will be completed through the contacts R21a (Fig. 7) now closed, R20c, R17a, R15a, all normally closed, the now closed switch 413 to energize the tubes T14 (Fig. 47c of the Gardinor application). As set forth in this application, the energization of the tube T14 will cause the relay R26 to be energized which, in turn, will energize the relay R2 (Fig. 47c of the Gardinor application). The energization of relay R2 will in turn initiate a punch clutch cycle by energizing the punch clutch magnet 204 (Fig. 47c of the Gardinor application). After R2 has been energized the relay R25 (Fig. 47c of the Gardinor application) will then be energized.

Inasmuch as the present invention is directed toward the use of only a numeric keyboard instead of an alphabetical keyboard of the type disclosed in the Gardinor application, the Gardinor circuit, with regard to the connections for the "1" program contacts (Fig. 47c of the Gardinor application), has been modified. Thus the sensing of the "1" in the program card 15 will set up a circuit from program contacts "1" now closed to the junction of the contacts R4a and R25c (Fig. 47b of Gardinor application), contacts R25c now closed, R24d as shown, rectifier 409, R23c and R22c now closed, control grid of the tube T4, causing the same to be energized, resulting in the escape magnet 104 being energized. The energization of the escape magnet 104 cause the detail card to shift to column 40 while the program cards will shift to column 41.

Simultaneous with the sensing of the "0" and "1" perforations in the program card 15, the "11" and "0" perforations in the program card 16 will be sensed by the corresponding star-wheel.

The now closed "11" star-wheel contacts 246a (Fig. 1d) associated with the program card 16 will enable a circuit to be completed through the contacts R201e and R20a, normally closed, to energize the tube T1 (also shown in Fig. 47b of the Gardinor application). The energization of the tube T1 will then enable a circuit to be completed through contacts R20b and R201c (Fig. 1d) for energizing the relay R48. Now with relay R48 energized, the "0" contacts 246a (Fig. 1e) associated with the program card 16 closed, and the cam controlled contacts P6 (Fig. 1d) now closed due to the initiation of the punch clutch cycle by the program card 15, a circuit will be established from the contacts P6 for energizing the time read-out relay R46 (Fig. 1c) which may be traced as follows: contacts P6 (Fig. 1d) now closed, conductor 34, "0" program contacts 246a (Fig. 1e) now closed, R48k shifted, conductor 35 (Figs. 1e to 1d), cable 36 (Figs. 1d to 1c), conductor 37, time read-out relay R46, line 32, to the conductor 20. Relay R46 is a latch type relay and its contacts will be latched in position upon R46 being energized.

The initiation of a punch clutch cycle, in conjunction with the relay R48 being in an energized condition, will enable a circuit to be established when the cam controlled contacts P6 (Fig. 1d) make for energizing the duplicate interlock relay R125 (Fig. 1d). The circuit is traceable from the contacts P6 as follows: contacts R48k now closed, R201f normally closed, relay R125, conductor 38 to the line 20. The relay R125 upon being energized and through its associated contacts (Fig. 1n), opens the pin contacts circuit to prevent duplication from a preceding card during the time we are reading out of the various time storage units.

It is to be noted that the cam controlled contacts P6 (Fig. 1d) are now coupled directly to the program contacts 246a in addition to the coupling arrangement as shown in Fig. 47a of the Gardinor application. Likewise the "11" and "12" program contacts 246a (Fig. 1d here) have now been connected in such a fashion as to control the functioning of the tubes T1 and T2.

Simultaneous with the energization of the time read-out relay R46 (Fig. 1c), a parallel circuit will be set up from conductor 37 (Fig. 1c) through the now transferred contacts R117j, R80n as shown, and R77n now transferred, time carry relay R22, conductor 32, to the line 20, whereby the latch type relay R22 becomes energized. It is to be noted that a circuit will only be completed to the relay R22 whenever the numerical difference between the Time On and the Time Off is equal to or greater than ten.

With the program cards 15 and 16 now in column 41 position, the corresponding star-wheels will sense the respective "0" and "1" perforations. As previously set forth, the sensing of the "0" perforation in the program card 15 will close the contacts 246 (Fig. 7) thereby causing a punch clutch cycle to be initiated. During the punch clutch cycle the cam controlled contacts P6 (Fig. 1d) will make thereby enabling a circuit to be established through the now closed "1" program contacts 246a (Fig. 1d) for energizing the 1 interposer magnet 188 (Fig. 1n). This circuit may be traced from the cam controlled contacts P6 as follows: line 34, "1" program contacts 246a now closed, contacts R48a and R49a as shown, conductor 135, the 1 contact of the switch 40 (Fig. 2a), conductor 136 (Figs. 2a to 2b), conductor 137, the now closed time read-out contacts R46a (Fig. 1f), the 1 punch bus 41 (Figs. 1f to 1h), contacts R50a now closed, to the 1 interposer magnet 188.

As set forth in the Gardinor application, the energization of the 1 interposed magnet 188 will result in an escapement operation to the next column taking place prior to the punch operation. Thus upon energizing the 1 interposer magnet 188, the program cards 15 and 16 will escape to column 42, while the detail card will escape to column 41. The detail card will, after escaping to column 41, have a "1" punched therein.

In column 42 the corresponding star-wheels will sense a "12" and a "2" perforation in the program cards 15 and 16. The "12" perforation in the program card 15 will set up a hold circuit which will give continuous punch clutch cycles until the absence of a "12" perforation in one of the columns. Thus with the punch clutch cycle initiated by the sensing of the "12" perforation in the record card 15, a circuit will be established for reading out the digit set in the second position of the month switches 41 and 42. This circuit may be traced from the cam controlled contacts P6 (Fig. 1d) as follows: line 34 (Figs. 1d to 1e), the "2" program contacts 246a now closed, contacts R48b and R49b as shown, conductor 138, the 2 contacts of the switch 42 (Fig. 2a), conductor 139 (Figs. 2a to 2b), conductor 140, the time read-out contacts R46b now closed (Fig. 1f), the 2 punch bus 43 (Figs. 1f to 1h), normally closed contacts R59b, the 2 interposer magnet 188, and then to the high side of the 140 volt power supply source.

Once again the energization of the 2 interposer magnet 188 will cause the record card to escape to column 42 wherein the "2" index position will be perforated, and the program cards 15 and 16 to escape to column 42. Simultaneous with the reading out of the switch 42 (Fig. 2a)

and with the "2" program contacts 246a (Fig. 1e) in a closed position, a circuit will be established for energizing the relay R13 (Fig. 1b). This circuit may be traced from the cam controlled contacts P6 (Fig. 1d) as follows: conductor 34, the "2" program contacts 246a (Fig. 1e) now closed, contacts R48b and R49b as shown, line 45, the rectifier 88, the resistor 89, the cable 36 (Figs. 1d, 1c and 1b), line 46, contacts R52a as shown, relay R13, the line 30 to the conductor 20. The energization of the latch type relay R13 will, when the program cards 15 and 16 are in column 54 position, be instrumental in completing a circuit for punching a "0" in column 54 of the record card thereby indicating that at the end of the quarter-hour interval the receiver was tuned to the same station.

If relay R12 (Fig. 1b) had been energized in place of relay R13, then an "X" would be punched in column 54 of the record card thereby indicating that the receiver was tuned to silence during the quarter-hour interval. If relays R12 and R13 are energized together, then a "1" will be punched in column 54 of the record card thereby indicating that the receiver was tuned to a different station during the quarter-hour interval. The energization of the relay R13 will close the contacts R13c (Fig. 1b) thereby enabling the transferring of a Time Off setting to a Time On setting.

With the program cards 15 and 16 in the column 43 position, the switch 44 (Fig. 2a), which is representative of the week of the month for which the survey has been made, will be read out. As previously stated, the "12" perforation in column 43 of the program card 15 will initiate a punch cycle, while the "3" perforation in column 43 of program card 16 will complete the circuit for reading out the switch 44. As previously described, the program cards will escape to column 44, while the record card will escape to column 43 wherein the "2" index position shall be punched.

With the program cards now in column 44 position, the program card 15 will, as before, initiate a punch clutch cycle while the "4" perforation in program card 16 will, in conjunction with the making of contacts P6 during the punch clutch cycle, cause the day switch 47 (Fig. 2a) to be read out. This operation will cause the program cards to escape to the next column, column 45, while the detail card will escape to column 44 wherein the "6" index point position shall be perforated.

With the program cards 15 and 16 now standing in column 45 position, the switch 48 (Fig. 2a) which is set to the higher digit of the hour of the day will be read out, and the "1" index point position in column 45 of the record card will be punched. When the program cards escape to column 46, the remaining digit of the hour of the day as set up in the switch 49 (Fig. 2a) will be read out, causing the "7" index point position in column 46 of the record card to be punched.

After the program cards have escaped to column 47 a pair of circuits will be established. One circuit will cause the quarter-day switch 50 (Fig. 2a) set in contacts "3" position to be read out causing a "3" to be perforated in column 47 of the detail card. The other circuit will be set up to energize the time correction relay R50 (Fig. 1c) providing the time correction switches 52 (Fig. 1c) are in a closed position. The corresponding time correction switches are only closed when a locality in which a station is located is operating upon advanced or daylight saving time.

Assuming that these time correction switches 52 are closed, which is not the case in the problem being described, a circuit is completed from the cam controlled contacts P6 as follows: line 34 (Fig. 1d), "7" program contacts 246a (Fig. 1e), contacts R48g and R49g as shown, conductor 53 (Figs. 1e to 1d), rectifier 88, resistor 89, the cable 36 (Figs. 1d and 1c), conductor 56, contacts R38b as shown, R35c now closed, the corresponding time correction switch 52 in a closed position, the relay R50, line 32 to the conductor 20.

In columns 48 to 51 the data which has been entered previously in the columns 44 to 47 will be punched therein under control of the time correction relay R50. If the time correction relay has not been energized, the same data appearing in columns 44 to 47 will be repeated in columns 48 to 51. While on the other hand, if the relay R50 is energized, the switches 51, 127, 128 (Fig. 2a) and 64 set to indicate daylight saving time will be read out into columns 48 to 51. Also when the time correction relay R50 is energized, a circuit will be established when the program card 16 is in column 48 position to punch an "X" in column 48 of the record card to indicate that the data punched in columns 48 and 51 is representative of advance or daylight saving time. This circuit may be traced from the cam controlled contacts P6 (Fig. 1d) as follows: line 34 (Fig. 1e), "8" program contacts 246a, contacts R48h and R49h as shown, time correction contacts R50a shifted, conductor 56, cable 57 (Fig. 1f), line 58, contacts R50e now assumed to be closed, the 11 punch bus 59 (Figs. 1f to 1n), contacts R59k normally closed, the 11 interposer magnet 188 to the high side of 140 volt power supply source.

With the program card now in column 52 position, the program card 15 containing a "12" perforation therein will initiate a punch cycle in the manner as previously described. The program card 16 having a "12" and a "2" perforation in column 52 thereof will, after the initiation of the punch clutch cycle by card 15, cause a pair of circuits to be established. The first circuit which is completed with the sensing of the "12" perforation by the corresponding star-wheel is traceable from conductor 403 (Fig. 1d here and Fig. 47b in the Gardinor application) as follows: conductor 60 (Fig. 1d), "12" contacts 256a now closed, R201h as shown, tube T2, contacts R201i as shown, relay R49, conductor 61, resistor 62 to the line 20. This circuit just traced causes the relay R49 to be energized.

The second circuit which will read out the quarter-hour switch 63 (Fig. 2b) is traceable from the cam controlled contacts P6 (Fig. 1d) during the punch clutch cycle as follows: conductor 34 (Fig. 1d), "2" program contacts 246a now closed, R48b as shown, R49b shifted, conductor 143 (Figs. 1e to 1f), the 1 contacts of the switch 63 (Fig. 2b), conductor 136, conductor 137, contacts R46a (Fig. 1f) now closed, the 1 punch bus 41 (Figs. 1f to 1n), contacts R59n normally closed, the 1 interposer magnet 188, to the high side of 140 volt power supply source. As described in the Gardinor application, the energization of the interposer magnet will cause the program cards 15 and 16 to escape to column 53 and the detail card to escape to column 52 wherein the "1" index point shall be perforated.

In column 53 position the program card 15 containing a "12" perforation therein, upon being sensed by the corresponding star-wheel, will initiate a punch clutch cycle. The program card 16 containing a "12" and a "3" perforation in column 53 thereof will cause the "X" position in the corresponding column of the record card to be punched thus indicating that the set was tuned from silence, as well as unlatching the relay contacts of the time read-out relay R46 (Fig. 1c).

As in the case of the "12" perforation in columns 51 and 52 of the program card 16, the "12" perforation in column 53 of the card 16 will cause the energization of the relay R49 (Fig. 1d). The "3" perforation in column 53 of the program card 16 will, upon being sensed by the corresponding star-wheel, establish two circuits during the punch clutch cycle initiated by the program card 15.

One circuit which will cause the "X" to be perforated in column 53 of the record card is traceable from the cam control contacts P6 (Fig. 1d) as follows: conductor 34 (Figs. 1d to 1e), "3" program contacts 246a now closed, contacts R48c as shown, contacts R49c transferred, conductor 66 (Figs. 1e to 1f), the cable 57 (Fig. 1f), contacts R11a as shown, R10a shifted, the 11 punch bus 59 (Figs. 1f to 1n), contacts R59k normally closed, the 11 interposer magnet 188 to the high side of the 140 volt power supply source. The energization of this interposer magnet will cause an escapement operation to take place followed by the punching of the "11" index point position in column 53 of the record card.

The other circuit which will unlatch the time read-out relay R46 during a punch clutch cycle may be traced from the cam control contacts P6 (Fig. 1d) as follows: line 34 (Figs. 1d to 1e), the "3" program contacts 246a now closed, R48c as shown, R49c shifted, conductor 57 (Figs. 1e to 1d), the rectifier 88 and the resistor 89 (Fig. 1d), the cable 36 (Figs. 1d to 1c), the line 69, the latch coil of the relay R46, conductor 32 to the line 20.

With the program card 15 having escaped to column 54 position, the "12" perforation punched therein will initiate a punch clutch cycle. The program card 16 also now in column 54 position will, due to the "12" and "4" perforations therein, cause the station read-out relay R18 (Fig. 1b) to be energized as well as causing the 0 interposer magnet 188 to be energized. The circuit established during the punch clutch cycle for energizing the station read-out relay R18 may be traced from the cam controlled contacts P6 (Fig. 1d) as follows: line 34 (Figs. 1d to 1e), the "4" program contacts 246a now closed, contacts R48d as shown, R49d transferred, line 70 (Figs. 1e to 1d), the rectifier 88 and the resistor 89 (Fig. 1d), cable 36 (Figs. 1d, 1c and 1b), conductor 73 (Fig. 1b), contacts R45f, R43f, R41f, R39b, all as shown, the pick-up coil of the relay R18, conductor 30, to the line 20. Thus with the energization of the station read-out relay R18, the associated contacts R18a to R18j, inclusive (Fig. 1f), are all closed in preparation for reading out the station switches 78, 79, 80, 81 and 82 (Fig. 3).

The circuit for energizing the 0 interposer magnet 188 is traceable from the cam controlled contacts P6 as follows: line 34 (Figs. 1d to 1e), "4" program contacts 246a now closed (Fig. 1e), R48d as shown, R49d transferred, conductor 75 (Figs. 1e to 1f), the cable 57 (Fig. 1f), contacts R13a transferred, R12b as shown, line 76, the 0 punch bus 77 (Figs. 1f to 1n), contacts R59j normally closed, the 0 interposer magnet 188 to positive side of 140 volt power source.

As previously set forth, this last circuit causes an escapement operation prior to the punching of the "0" index point position in column 54 of the record card. The punching of the "0" index point position in column 54 of the record card indicates that the same station is still tuned in at the end of the quarter-hour interval.

If the tape 10 (Fig. 5) had indicated a station other than those for which a station key had been assigned, either the manual daylight station key 25 or the manual standard key 65 (Fig. 1f) will be depressed, depending upon the time condition. In either case the relay R39 (Fig. 1b) will be energized. Thus under such circumstances when the program card 16 is in column 54 position, the relay R20 (Fig. 1b) will be energized instead of the station read-out relay R18.

The circuit for energizing the relay R20 is as follows: the cam controlled contacts P6 (Fig. 1d), conductor 34 (Figs. 1d to 1e), the "4" program contacts 246a now closed, R48d as shown, R49d shifted, line 70 (Figs. 1e to 1d), rectifier 88, resistor 89 (Fig. 1d), cable 36 (Figs. 1d, 1c and 1b), line 73, contacts R45f, R43f and R41f, all as shown, R39b shifted, the pick-up coil of the relay R20, line 30 to the conductor 20.

The energization of the relay R20 causes the associated contacts R20a and R20b (Fig. 1d) to be transferred. The contacts R20a transfers control of the tube T1 from the control of the "1" program contacts 246a (Fig. 1d) to that as shown and described in the copending Gardinor application, thereby enabling the code numbers of the station tuned in to be manually punched in the record card. The contacts R20b in a shifted condition transfers the output of the tube T1 to the keyboard restore relay 352 for manual station punch operation. Likewise, the now open contacts R20c (Fig. 7) will render ineffective the controlling influence of the "0" perforation in the program card 15, while the contacts R20d (Fig. 1n) will complete a circuit to the keyboard latch contacts 363 of the keyboard (Fig. 47a of the Gardinor application). Thus with relay R20 energized, the code numbers representative of the station tuned to may now be manually punched in columns 55 to 59 of the record card.

With the program cards 15 and 16 now in column 55 position and the station read-out relay R18 (Fig. 1b) energized, the station code numbers representative of the station tuned in as set in the switches 78, 79, 80, 81 and 82 (Fig. 3) will be successively read out and punched in the respective columns 55 to 59, inclusive. As in the case of column 41, the program card 15 has a "0" perforation in column 55 which, upon being sensed by the corresponding star-wheel, will initiate a punch clutch cycle. The program card 16 contains a "12" and a "5" perforation in column 55. The "12" perforation, as previously described, will cause the relay R49 (Fig. 1d) to be energized. The "5" perforation during the punch clutch cycle will, when sensed by the corresponding star-wheel, establish a circuit for energizing the 1 interposer magnet 188 (Fig. 1n) and a circuit for resetting the relays R9, R10 and R11 (Fig. 1b).

The circuit for energizing the interposer magnet is traceable from the cam controlled contacts P6 (Fig. 1d) as follows: line 34 (Figs. 1d to 1e), "5" program contacts 246a (Fig. 1e) now closed, R48e as shown, R49e transferred, line 83 (Figs. 1e to 1f), cable 57, conductor 147 (Fig. 1f), contacts R41d, R43d, and R45c, all as shown, line 84, the 1 contacts of the switch 82 (Fig. 3), line 85, line 86, station read-out contacts R18a now closed, the 1 punch bus 41 (Figs. 1f to 1n), contacts R59a, closed, the 1 interposer magnet 188 to the high side of the 140 volt power supply source.

The energization of the interposer magnet causes the program cards 15 and 16 to escape to column 56, and the record card to escape to column 55 wherein a "1" is punched.

The circuit established for energizing the trip coils of the relays R9, R10 and R11 (Fig. 1b) may be traced from the "5" program contacts 246a now closed, as follows: R48e as shown, R49e transferred, line 87 (Figs. 1e to 1d), the rectifier 88 (Fig. 1d), the resistor 89 (Fig. 1d), cable 36 (Figs. 1d to 1b), line 90 (Fig. 1b), parallel circuit consisting of the relay R9, contacts R56d, relay R10, and contacts R55e as shown, relay R11, the line 30 to the line 20.

In column 56 the program card 15 once again will initiate a punch clutch cycle while the program card 16, having a "12" and a "6" perforation, will respectively energize the relay R49 (Fig. 1d) in a manner as previously described, and energize the relay R11 (Fig. 1b) and the 2 interposer magnet 188 (Fig. 1n). The sensing of the "6" perforation by the corresponding starwheel during the punch clutch cycle will set up two circuits.

The first circuit may be traced from the cam controlled contacts P6 (Fig. 1d) as follows: line 34 (Figs. 1d to 1e), the "6" program contacts 246a now closed (Fig. 1e), contacts R48f as shown, R49f transferred, line 91 (Figs. 1e to 1d), the corresponding rectifier 88 and resistor 89 (Fig. 1d), the cable 36 (Figs. 1d to 1b), line 92 (Fig. 1b), contacts R13b now closed, the pick-up coil of the relay R11, the line 30 to the conductor 20. The energization of the relay R11 at this time conditions the circuit for the next card to be punched inasmuch as it indicates that the receiver is still tuned to the same station.

The second circuit which is established may be traced from the now closed "6" program contacts 246a (Fig. 1e) as follows: contacts R48f as shown, R49f transferred, line 93 (Figs. 1e to 1f), cable 57, conductor 149 (Fig. 1f), contacts R41e, R43e, R45e, all as shown, line 94, the 2 contacts of the switch 81 (Fig. 3), conductor 95, conductor 96, the station read-out contacts R18b now closed, the 2 punch bus 43 (Figs. 1f to 1n), contacts R59b now closed, the 2 interposer magnet 188 to the high side of the 140 volt power supply source.

The energization of the interposer magnet causes an escapement operation and a "2" to be punched in column 56 of the record card. In a similar manner the program cards 15 and 16 shall cause the switches 80, 79 and 78 (Fig. 3) to be successively read out such that a "3," or "4" and "5" will be punched in columns 57, 58 and 59 of the record card.

If the hunting relay R41 (Fig. 1b) had been energized instead of the station relay R35 (Fig. 1b), a code number 00350 will be punched in the respective columns 55 to 59. It is to be noted with reference to Fig. 1f and Fig. 1g that the contacts associated with the relay R41, upon being shifted, complete a circuit directly to the punch buses for the columns 55 to 59. If the unidentified relay R43 (Fig. 1b) had been energized, the code number 99950 will be punched in columns 55 to 59, while if the sign off relay R45 had been energized the code 99750 in columns 55 to 59 of the record card would be punched. The energization of the sign off relay R45 indicates that a set was still tuned in after the station signed off the air.

With the program cards now in column 60 position, the program card 15 will once again initiate a punch clutch cycle while the card 16 will cause the trip coils of the relays R18 and R20 (Fig. 1b) and the station key restore magnet 97 (Fig. 1a) to be energized, as well as reading out the tens digit of the time the station was tuned in as entered by the energization of the proper Time On relay. The circuit for energizing the trip coils of the relays R18 and R20 may be traced from the "0" program contacts 246a (Fig. 1e) as follows: contacts R48k as shown, R49k transferred, line 98 (Figs. 1e to 1d), the corresponding rectifier 88 and resistor 89 (Fig. 1d), cable 36 (Figs. 1d to 1b), line 99, the parallel circuit consisting of relays R18 and R20, the line 30 to the line 20, and line 149 (Figs. 1b to 1a), contacts R120e normally closed, the station key restore relay 97 to the line 20.

The circuit established for reading out the tens digit of the time the station was first tuned in is traceable from the "0" program contacts 246a (Fig. 1e) as follows: contacts R48k as shown, R49k shifted, line 100 (Figs. 1e to 1f), the cable 57 (Figs. 1f to 1g), conductor 150 (Fig. 1g), contacts R97d, R96e, R95f, R93g, R91h, all as shown, to the 0 punch bus 77 (Figs. 1g to 1n), contacts R59j, the 0 interposer magnet 188 to the high side of the 140 volt power supply source. The energization of the interposer magnet causes an escapement operation and a "0" to be punched in column 60 of the record card. In a much similar manner, the 4 value representative of the units digit of the time that the station was tuned in will be punched in column 61. A "1" and a "5" respectively representative of the tens and units digit corresponding to the value equivalent to the Time Off relay energized will be punched in columns 62 and 63 of the record card.

With the program cards now in column 64 position, the circuit will be established for successively punching in columns 64 and 65 the elapsed time during a quarter-hour period that the home receiver was tuned to a particular station; in the present case this being station 13.

After a punch clutch cycle has been initiated by the program card 15, the program card 16 having an "11" and a "4" perforation therein will respectively cause the relay R48 (Fig. 1d) to be energized and the tens digit of the elapsed listening time to be read out and punched in column 64 of the record card. The circuit established for energizing the relay R48 may be traced as follows: the "11" program contacts 246a now closed (Fig. 1d), contacts R201e, R20a, each as shown, the tube T1, contacts R20b and R201c, each as shown, the relay R48, line 61, resistor 62 to the line 20.

The circuit completed when the "4" program contacts 246a are closed during the punching cycle is traceable as follows: the "4" program contacts 246a now closed (Fig. 1e), R48d transferred, conductor 102 (Figs. 1e to 1f), cable 57 (Figs. 1f to 1j), the Time Carry relay contacts R22a now transferred, the 1 punch bus 41 (Figs. 1j to 1n), contacts R59a now closed, the 1 interposer magnet 188 to the high side of the 140 volt power supply source. After the interposer magnet 188 has been energized the cards will escape to the next higher column and a "1" will be punched in column 64 of the record card.

With the program cards now in column 65 position, the units digit of the elapsed listening time will be punched in column 65 of the record card and at the same time the Home Number read-out relay R60 (Fig. 1c) will be energized. The circuit established for energizing the Home Number read-out relay R60 may be traced from the now closed "5" program contacts 246a (Fig. 1e) as follows: contacts R48e transferred, line 103 (Figs. 1e to 1d), the corresponding rectifier 88 and resistor 89 (Fig. 1d), the cable 36 (Figs. 1d to 1c), conductor 104, pick-up coil of relay R60, line 32 to the conductor 20.

The circuit established for punching the units digit of the elapsed listening time is traceable from the now closed "5" program contacts 246a (Fig. 1e) as follows: contacts R48e, line 105 (Figs. 1e to 1f), the cable 57 (Figs. 1f to 1j), conductor 151, the Time Off relay contacts R117h now closed, conductor 106 (Figs. 1j to 1m), the Time On relay contacts R77c transferred, the 1 punch bus 41, contacts R59a now closed, the 1 interposer magnet to the positive side of the 140 volt power supply source. As previously, the energization of the interposer magnet will cause a "1" to be punched in column 65 of the record card subsequent to an escapement operation taking place. Thus the "1" index point position of the respective columns 64 and 65 has been punched to indicate that the elapsed listening time for station 13 has been 11 minutes for the quarter-hour interval being recorded. It is to be noted that the elapsed time network of Figures 1j, 1k, and 1m is so constructed as to produce an open circuit condition to bring the machine to a halt when the Time Off setting is lower than the Time On setting.

After the program cards have escaped to column 66, the first digit of the Home Number will be punched in column 66 of the record card. The trip coils of the Time On relays will be energized and the time key restore relay 22 (Fig. 1a) will also be energized.

The circuit established for reading out the Home Number switch 124 (Fig. 4) which is set in the "1" contacts positions is traceable from the now closed "6" program contacts 246a (Fig. 1e) as follows: R48f now transferred, line 107 (Figs. 1e to 1f), cable 57 (Figs. 1f to 1m), line 108, the 1 contacts of the switch 124, conductor 109, the Home Number read-out relay contacts R60b now closed, the 1 punch bus 41, contacts R59a now closed, the 1 interposer magnet 188 to the high side of the 140 volt power supply source. As is well known by this time, the energization of the interposer magnet causes the record card to escape to column 66 wherein the "1" index point position is punched.

The circuit established for energizing the trip coils of the Time On relays and the time key restore magnet 22 (Fig. 1a) is traceable from the now closed "6" program contacts 246a (Fig. 1e) as follows: contacts R48f transferred, line 110, the corresponding rectifier 88 and resistor 89, the cable 36 (Figs. 1d, 1c and 1b), conductor 111 (Figs. 1b to 1a), a parallel circuit consisting of the Time On relays, and contacts R202a as shown, and the time key restore magnet 22 and then to the conductor 20.

The energization of the trip coil of the Time On relays will unlatch all of the Time On relay contacts, while the energization of the time key restore magnet will unlatch the last Time On key 23 to be depressed. The time keys 23 are adapted to be latched when depressed and unlatched when the next time key is depressed.

At this time also a circuit will be established for energizing the trip coils of the station error relays R14 and R15 (Fig. 1b). This circuit may be traced from the now closed "6" program contacts 246a (Fig. 1e) as follows: contacts R48f transferred, conductor 110 (Figs. 1e to 1d), the corresponding rectifier 88 and resistor 89, the cable 36 (Figs. 1d to 1b), the line 113, the trip coils of the relays R14 and R15, the conductor 30 to the line 20.

In column 67 position, the program card 16 having an "11" and a "7" perforation punched therein during the punch clutch cycle which has been initiated by the program card 15, will cause the Home Number switch 125 (Fig. 4) set in the "2" contacts position to be read out and punched in column 67 of the record card, the station error relay R14 (Fig. 1b) to be energized, as well as transferring the Time Off setting to a Time On setting in preparation for the next following card. The reading out of the "2" contacts position of the switch 125 is similar to that described for reading out the "1" contacts position of the switch 124 except that the former switch is read out under the control of the "7" program contacts 246a (Fig. 1e).

The circuit established for energizing the station error relay R14 is traceable from the now closed "7" program contacts 246a (Fig. 1e) as follows: contacts R48g transferred, conductor 114 (Figs. 1e to 1d), the corresponding rectifier 88 and resistor 89, the cable 36 (Figs. 1d, 1c and 1b), conductor 115, contacts R120f normally closed, R117k now closed, the pick-up coil of the relay R14, conductor 30 to the line 20.

The energization of the relay R14 at this time stores the 15 Time Off indication which signifies continued listening to station 13 through the feed cycle into the next card. Thus if in the next cycle a station key is depressed causing the contacts 153 (Fig. 1b) to close, the now closed contacts R14a (Fig. 1b) will set up a circuit for energizing the station error relay R15 which, upon being energized, will cause the punching operation to stop.

The circuit established for transferring the Time Off setting as represented by relay R117 (Fig. 1a) in an energized state to the Time On relay R65 is similar to the circuit traced for relay R14 up through conductor 115 (Fig. 1b) and may be traced therefrom as follows: conductor 116 (Fig. 1b), contacts R13c now closed, conductor 117 (Figs. 1b to 1a), contacts R117b now closed, the pick-up coil of the relay R65, the line 27 to the line 20. It is to be noted that this particular transferring operation takes place only when relay R13 is energized. The relay R13 will be energized whenever there is continued listening either to the same station or to a different station. The relay R13 will not be energized when the receiver is tuned to silence. It now becomes obvious that a Time On reading will be manually entered by depressing the proper key only when coming from a "from silence" tuning condition or when a "to silence" condition is encountered during a listening period.

In column 68 position during a punch clutch cycle as initiated by the program card 15, the program card 16 through the combination of the "11" and "8" perforations punched therein, will cause the "3" contacts position of the Home Number switch 126 (Fig. 4) to be read out and the trip coils of the bail relays R1, R2, R3, R4 and R5 (Fig. 1b), the Time Off relays, and the tuning to relays R12 and R13 (Fig. 1b) to be energized. The circuit for reading out the "3" contacts position of the Home Number switch 126 (Fig. 4) which is completed when the "8" program contacts 246a are closed during a punch clutch cycle is similar to that described in reading out the Home Number switch 124 (Fig. 4) and therefore it will not be repeated here.

The circuit established for energizing the trip coils of the bail relays R1, R2, R3, R4 and R5 (Fig. 1b) is traceable from the now closed "8" program contacts 246a (Fig. 1e) as follows: contacts R48h transferred (Fig. 1e), conductor 118 (Figs. 1e to 1d), the corresponding rectifier 88 and resistor 89, the line 119, cable 36 (Figs. 1d, 1c, 1b), line 120, the trip coils of the relays R1, R2, R3, R4 and R5, conductor 30 to the line 20.

The circuit established for energizing the trip coils of the Time Off relays and the tuning to relays R12 and R13 may be traced from the "8" program contacts 246a now closed, as follows: contacts R48h transferred, conductor 118 (Figs. 1e to 1d), line 121, the cable 36 (Figs. 1d, 1c, 1b), line 122 (Figs. 1b to 1a), a parallel circuit consisting of the trip coils of the Time Off relays (Fig. 1a), and contacts R202c as shown, conductor 123 (Figs. 1a to 1b), the trip coils of the relays R12 and R13 (Fig. 1b) and then to the conductor 20.

With the card now in column 69 position the program card 15 containing a "0" and a "1" perforation will cause the cards to be spaced to column 70. As previously described, when the corresponding star-wheel senses the "0" perforation in the card 15, the relays R26, R2 and R25 (Fig. 47c of the Gardinor application) will be energized in succession. Thus when the relay R25 becomes energized causing the contacts R25c to close (Fig. 47b of the Gardinor application), a circuit will be established through the "1" program contacts 246 for energizing the escape magnet 104 to cause the cards to escape to column 70.

Prior to the cards escaping to column 70, the program card 16, bearing an "11" and a "9" perforation, will establish a circuit for energizing the trip coil of the Home Number read-out relay R60 (Fig. 1c) thereby restoring the corresponding contacts thereof to the normal position.

When the "11" perforation is sensed in column 70 of the program card 15 a skipping operation shall be commenced in a manner such as described in the Gardinor application. The skipping operation will be continued under the control of the "12" perforation in the columns 71 to 80 of the program card 15 such that the record card will be ejected when it passes column 80 position. At the same time a new card is fed into position and it automatically skips to column 39 in a manner as previously described.

During the time the new card is being fed into position the cam controlled contacts CF4 (Fig. 1d) become effective in establishing obvious circuits for energizing the trip coils of the relays R125 (Fig. 1d), R21, R22, and R50 (Fig. 1c). The energization of these relays will unlatch the corresponding contacts thereof. This next following record card will remain in column 39 position until a Time Off key is depressed where the key to be depressed is dependent upon the visual examination of the next 15 minutes in the tape 10. Since the tape 10 in Figure 5 indicates that a station change occurred at the end of the 15-minute interval, the 15SC time key 23 (Fig. 1a) will be depressed. Since the Time On relay R65 (Fig. 1a) and the station relay R35 (Fig. 1b) are energized at this time, the depressing of the 15SC time key 23 will cause the energization of the corresponding relay R120 and will complete a circuit to the punch interlock relay R21 (Fig. 1c) in a manner as previously described. Energization of the relay R21 will then begin the automatic punching operation under the control of the program cards 15 and 16 in a manner as previously described.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described comprising: a first program control element; a second program control element; a plurality of manually settable devices; each said element bearing a plurality of columns of perforated positions; means for selectively deriving program data from each said element, and including sensing means and circuits controlled thereby for reading out said devices pursuant to the data sensed; a first, second and third set of relay means; a series of normally open labyrinth circuits controlled by said first, second and third relay means; means for selectively closing one of said labyrinth circuits through the energization of one relay of each said first, second and third set, said last-mentioned means controlling said first-mentioned means such that the reading out of said devices are further dependent upon the closing of one of said labyrinth circuits.

2. In a machine of the class described comprising: a plurality of manually settable devices; a plurality of record sources of program data; normally ineffective means for repeatedly sensing said sources, and including circuits controlled thereby for selectively reading out said settable devices; a plurality of storage devices; a normally open electrical network controlled by said devices and controlling said normally ineffective means; means for entering an item in each of said storage devices thereby causing a circuit to be completed through said network whereby said normally ineffective means is rendered effective.

3. In a machine of the class described comprising: a set of punches, means for advancing a card step by step past said punches, escapement mechanism therefor; a first program controlling means bearing a plurality of columns of perforated positions; a second program controlling means bearing a plurality of columns of perforated positions; a plurality of settable devices; a normally ineffective means for selectively deriving program data from said first controlling means, and including corresponding sensing means and circuits controlled thereby for controlling said escapement mechanism; means for selectively deriving program data from said second controlling means under the control of said first controlling means, and including corresponding sensing means and circuits controlled thereby for operating said punches in accordance with the setting of said settable devices; a source of current; a plurality of sets of storage means, each including a plurality of relays, there being a set of contacts for each relay in each set; a normally open circuit network interconnecting said set of contacts; a current responsive device connected to said network and controlling said means for selectively deriving program data from said first controlling means, said network being arranged to connect said responsive device to said current when one relay in each set is energized; means for energizing a single relay in each of said sets thereby completing a circuit through said network to said responsive device whereby said normally ineffective means becomes effective.

4. In a machine of the class described comprising: a plurality of punches, means for advancing a card step by step past said punches, escapement mechanism therefor; a plurality of manually settable elements; a first program data containing element; a second program data containing element; a first, second and third set of settable devices, each of said sets including a plurality of relay means, contacts controlled by each of said relay means and intercoupled in a network arrangement such that a circuit would be completed therethrough when one of said relay means within each set is energized; a source of current coupled to said network, a current responsive device coupled to said network, said source being connected to said responsive device when a circuit is completed through said network; a first means for selectively deriving program data from said first program element, and including sensing means and circuits controlled thereby for controlling said escapement mechanism; a second means controlled by said first means for selectively deriving program data from said second program element, and including sensing means and circuits controlled thereby for causing said settable elements to select the punches for operation; and means for energizing one of said relay means within each of said sets of settable devices whereby a circuit is completed through said network.

5. In a machine of the class described for recording in a record card data inscribed on a tape pertaining to the time a radio receiver was tuned in, the station tuned in, and the time the station was tuned out during a quarter-hour interval; a set of punches, means for advancing a card step by step past said punches, escapement mechanism therefor; a set of time-on relays, a set of time-off relays, and a set of station relays; means for entering the data inscribed in said tape in the corresponding one of said relays for each of said set; a first and second record source of program data each bearing a plurality of columns of perforated positions, a normally ineffective means for selectively deriving program data from said first source, and including corresponding sensing means and circuits controlled thereby for controlling said escapement mechanism; means for selectively deriving program data from said second source under the control of said first source, and including corresponding sensing means and circuits controlled thereby for operating said punches in accordance with the setting of said corresponding one of said relays; network means jointly controlled by each set of said relays for rendering said normally ineffective means effective upon said tape data being entered in said relays; and means under the control of said second program source and subsequent to punching the inscribed tape data in a record card for transferring the time-off indication entered in said time-off relays to the corresponding one of said time-on relays during periods of continuous listening, and further means for preventing said transferring when said radio is turned to silence.

6. In a machine of the class described for punching a data representation on a card corresponding to data inscribed on a tape relating to the time-on that a radio receiver was tuned in, the station tuned to and the time-off that the radio receiver was tuned out where a single card will be punched for a predetermined interval of said tape comprising: a set of punches, means for advancing a card step by step past said punches, escapement mechanism therefor; a set of time-on relays each representative of a particular minute except the last in said interval, means for entering in one of said time-on relays the time said receiver was tuned in as indicated by said tape; a set of time-off relays each representative of a particular minute except the first in said interval, means for entering in one of said time-off relays the time said radio receiver was tuned out as indicated by said tape; a set of station relays each representative of a transmitting station, means for entering in one of said station relays the station said receiver is tuned to as indicated by said tape; a first and second record source of program data each bearing a plurality of columns of perforated positions, a normally ineffective means for selectively deriving program data from said first source, and including corresponding sensing means and circuits controlled thereby for controlling said escapement mechanism; means for selectively deriving program data from said second source under the control of said first source, and including corresponding sensing means and circuits controlled thereby for operating said punches at predetermined times in accordance with the data entered in said time-on, time-off and station relays; circuit means jointly controlled by each set of said relays for rendering said normally ineffective means effective upon said tape data being entered in said relays; electrical network means jointly controlled by said sets of time-on and time-off relays and responsive to said second record source subsequent to the punching of said tape data in said card for enabling the elapsed listening time to be punched in said card; and means under the control of said second program source and subsequent to the punching of said elapsed time for transferring the time-off indication entered in said time-off relays to the corresponding one of said time-on relays during periods of continuous listening, and other means including a settable device for preventing said transferring when said radio is tuned to silence during said interval.

ROBERT B. HERBERT.
WILLIS E. FOX.

No references cited.